(12) United States Patent
Cowan

(10) Patent No.: US 6,389,129 B1
(45) Date of Patent: *May 14, 2002

(54) INTERFACE FOR INTERFACING CLIENT PROGRAMS WITH NETWORK DEVICES IN A TELECOMMUNICATIONS NETWORK

(75) Inventor: Daniel E. Cowan, Colorado Springs, CO (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/824,648

(22) Filed: Mar. 24, 1997

(51) Int. Cl.[7] ................................................. H04M 7/00
(52) U.S. Cl. ........................... 379/221.03; 379/221.04; 379/221.06; 709/220; 709/311
(58) Field of Search ............................... 379/34, 265, 1, 379/2, 10, 26, 29, 32, 279, 9, 14, 268, 15, 16, 17, 25; 709/201, 203, 205, 213, 217, 220, 230, 311, 400

(56) References Cited

U.S. PATENT DOCUMENTS

| | | | | |
|---|---|---|---|---|
| 5,065,393 A | * | 11/1991 | Sibbitt et al. | 370/58.2 |
| 5,084,816 A | * | 1/1992 | Boese et al. | 395/575 |
| 5,384,840 A | * | 1/1995 | Blatchford et al. | 379/229 |
| 5,420,916 A | * | 5/1995 | Sekiguchi | 379/230 |
| 5,469,503 A | * | 11/1995 | Butensky et al. | 379/265 |
| 5,490,134 A | | 2/1996 | Fernamdes et al. | |
| 5,495,470 A | * | 2/1996 | Tyburski et al. | 379/14 |
| 5,546,450 A | * | 8/1996 | Suthard et al. | 379/207 |
| 5,572,530 A | | 11/1996 | Chitre et al. | |
| 5,640,446 A | * | 6/1997 | Everett et al. | 379/115 |
| 5,692,030 A | * | 11/1997 | Teglovic et al. | 379/1 |
| 5,778,184 A | * | 7/1998 | Brownmiller et al. | 395/200.54 |
| 5,796,723 A | * | 8/1998 | Bencheck et al. | 370/229 |
| 5,854,930 A | * | 12/1998 | McClain | 395/500 |
| 5,867,689 A | * | 2/1999 | McClain | 395/500 |
| 5,937,042 A | * | 8/1999 | Sofman | 379/113 |
| 6,118,936 A | * | 9/2000 | Lauer et al. | 379/14 |

FOREIGN PATENT DOCUMENTS

| | | |
|---|---|---|
| EP | 0680186 A1 | 11/1995 |
| EP | 0751651 A2 | 1/1997 |

* cited by examiner

Primary Examiner—Duc Nguyen
Assistant Examiner—Rexford Barnie

(57) ABSTRACT

A generic interface is provided for interfacing multiple client application programs with multiple network devices. The client application programs may differ from each other and may include application programs for performing a network restoration, network maintenance, and network administration. The network devices may be of different device types. The interface converts communications between the client application programs and the network devices so that the communications are compatible with the requirements of the destination. The interface may include added functionality, such as an automatic auditing mechanism and a data link manager mechanism.

38 Claims, 23 Drawing Sheets

INTERFACE FOR INTERFACING CLIENT PROGRAMS WITH NETWORK DEVICES IN A TELECOMMUNICATIONS NETWORK

TECHNICAL FIELD

The present invention relates generally to telecommunications networks and, more particularly, to an interface for interfacing client programs with network devices in a telecommunications network.

BACKGROUND OF THE INVENTION

Telecommunication networks, such as telephone networks, include a number of different components. Typically, telecommunication networks include network devices that are interconnected by links that facilitate communications. Examples of network devices are digital cross-connects (DXCs), multiplexing equipment, line termination equipment, computer systems, and fiber transmission systems. A "link," as used herein, is a physical connection between network devices that carry network traffic. A single link may include multiple trunks where a "trunk" is a logical channel of communication with capacity that traverses one or more network devices and/or one or more links between network devices.

As was mentioned above, network devices may be of many different types. Consider a DXC that switches communication trunks based on external commands. There are many different types of DXCs and there are many different vendors who sell DXCs. Typically, each vendor's device has its own command set and its own format for data messages that contain commands.

Most telecommunication networks utilize a variety of network devices and managing such devices with common control systems is difficult. For example, a restoration system that restores traffic within a telecommunications network after a failure must be able to communicate with each of the different types of devices that are used to realize restoration. These devices include DXCs. The central control system must be able to send commands to and receive messages from each DXC within the affected area of the network. The central control system must be able to identify the type of device and the format of commands for that device. In addition, the central control system must be able to receive messages in different formats from different types of devices and interpret these messages in a common generic manner. These difficulties are complicated by many of the network devices being programmable devices that execute a given version of software. Identical devices may execute different versions of software and, hence, give rise to additional compatibility issues.

SUMMARY OF THE INVENTION

The present invention overcomes the difficulties of the prior art by providing a common interface that may interface multiple client programs with multiple network devices. The interface communicates with the client programs in a common format and communicates with the network devices in device-specific formats. The interface is able to convert communications from the device-specific formats of the network device into the common format of the client programs. Likewise, the interface is able to convert communications from the client programs in the common format into communications in the device-specific formats of the network devices. The interface may also include additional functionality, such as automatic auditing and monitoring of data links to utilize optimal data links.

In accordance with a first aspect of the present invention, a method of interfacing a program with network devices is performed by a computer system in a telecommunications network. An interface is provided for interfacing the program with the network devices, where each network devices has a device-specific communication format. A first communication, that is destined to selected network device, is received at the interface from the program in a first format. The interface converts the first communication from the first format to a second format that is the device-specific communication format of the selected network device to which the communication is destined. The converted communication is then forwarded in the second format from the interface to the selected network device.

In accordance with another aspect of the present invention, a telecommunication network includes a program that is run on a processor. The program adopts a communication format for communications. The telecommunications network also includes a number of network devices, where each network device has a device-specific communication format. An interface is provided in the telecommunications network for interfacing the program with the network devices to facilitate communications between the program and the network devices. The interface includes a converter for converting communications from the program that are destined to network devices into the device-specific communication formats of the network devices.

In accordance with a further aspect of the present invention, a computer-implemented method is practiced in a telecommunications network that has a network device, a processor that runs a program, and data links that lead to the network device. An interface is provided that interfaces the program with the network device. The interface determines which of the data links is most reliable and determines the data link to be the primary link that is to be used for communications with the network device. Another one of the data links is designated as a secondary link to be used for communications with the network device when the primary link fails.

BRIEF DESCRIPTION OF THE DRAWINGS

An exemplary embodiment to the present invention will be described in more detail below relative to the following figures.

DETAILED DESCRIPTION OF THE INVENTION

The exemplary embodiment of the present invention described herein provides a generic interface that interfaces client application programs with multiple network devices. The client application programs may perform different functionality including restoration, maintenance, and administration of a telecommunications network. The interface is especially well adapted for use in a telephone network, and for purposes of discussion below, it is assumed that the interface is utilized in a telephone network. The interface converts communications originating in a common format shared by the client application programs into device-specific formats of the network devices. Conversely, the interface converts communications from the network devices in the device-specific format into communications in the common format of the client application programs. As a result, the interface enables free communication between the client application programs and the network devices. The client application program need not have code and configuration information for communicating with each of the various network devices. Similarly, the network devices need not have added components for communicating directly with the client application programs. The interface, thus, greatly simplifies the ability of the client application programs to communicate with the network devices.

The interface may be implemented in computer-executable instructions. The interface may be implemented in software, hardware, firmware, or a combination thereof. As will be described in more detail below, multiple instances of the interface may be present within a given telecommunications network. The interface may include additional functionality, such as an automatic auditing functionality that generates audit requests at periodic intervals without external prompting. The audit request audits the network devices to retrieve information regarding status and configuration of the network devices. The interface may also include functionality for managing data links that connect the interface with the network devices. This functionality enables the interface to determine which of the data links leading to a given network device is most reliable. This most reliable data link is designated as a primary link for carrying communications to and from the network device. A secondary link is also designated to serve as a backup link that becomes operational when the primary link fails. The interface includes intelligence for changing what links are designated as the primary link and the secondary link in response to changing events and conditions within the telecommunications network.

Figure 1:
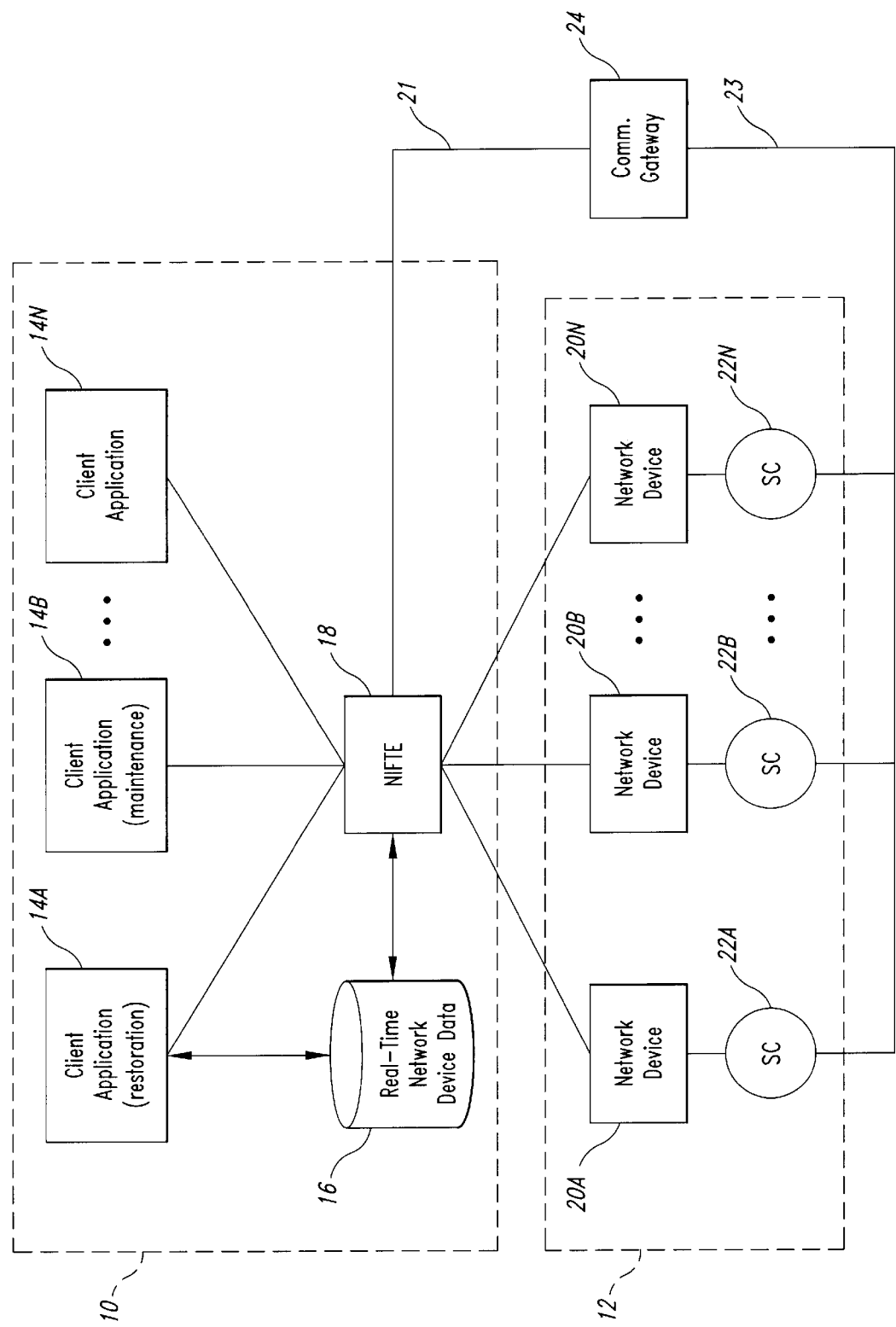
FIG. 1 is a block diagram illustrating a portion of the telecommunications network that is suitable for practicing a first option in accordance with the present invention.

FIG. 1 depicts a portion of a telecommunications network that represents a first option under the present invention. A second option will be discussed in more detail below. A computer system 10 is interfaced with network resources 12. The computer system 10 executes a number of client application programs 14A-14N, which may include an application program 14A for performing dynamic network restoration of the telecommunications system. The restoration application program 14A receives alarms from network devices and sends commands to the devices to restore traffic on the telecommunications network after a failure. The client application programs may also include a maintenance application program 14B that sends maintenance commands to network devices within the telecommunications system. Those skilled in the art will appreciate that different client application programs may be run on the computer system 10 and that additional client application programs may also be run on the computer system. Moreover, the application programs need not be run on a single computer system, but rather may be run on multiple computer systems that are in communication with each other.

The computer system stores real-time network device data that reflects the current configuration and topology in the network. This data may be organized in a separate database 16. The computer system 10 also executes an interface known as the network item front end (NIFTE). The NIFTE 18 serves as the common interface between the application programs and network devices. The details of the NIFTE 18 will be described below.

The network resources 12 communicate with the computer system 10 via the NIFTE 18. The network resources 12 includes a number of network devices 20A–20N. Those skilled in the art will appreciate that the network devices may be any of a number of different types of telecommunication devices, including digital cross connects (DXC). As discussed above, DXCs are devices that switch trunks among various ports in order to route traffic. DXCs play a critical function in network restoration. They are able to monitor traffic on their ports and generate alarms when an outage is detected. In addition, DXCs may receive and process commands from the restoration client application program 14A to restore network traffic. For purposes of the discussion below, it is assumed that the network devices 20A–20N are DXCs.

The NIFTE 18 has a backup communication path to each network device via communication gateway 24. The gateway 24 serves as a network concentrator interface between the NIFTE 18 and the network resources 12. Communication links 21 and 23 provide connectivity between the communication gateway 24 and the NIFTE 18 and the site controllers 22A–22N and the NIFTE, respectively. The communication links 21 and 23 may be standard X.25 connections. The site controllers 22A–22N provide access to the network devices 20A–20N. A separate site controller is located at each site.

Figure 2:
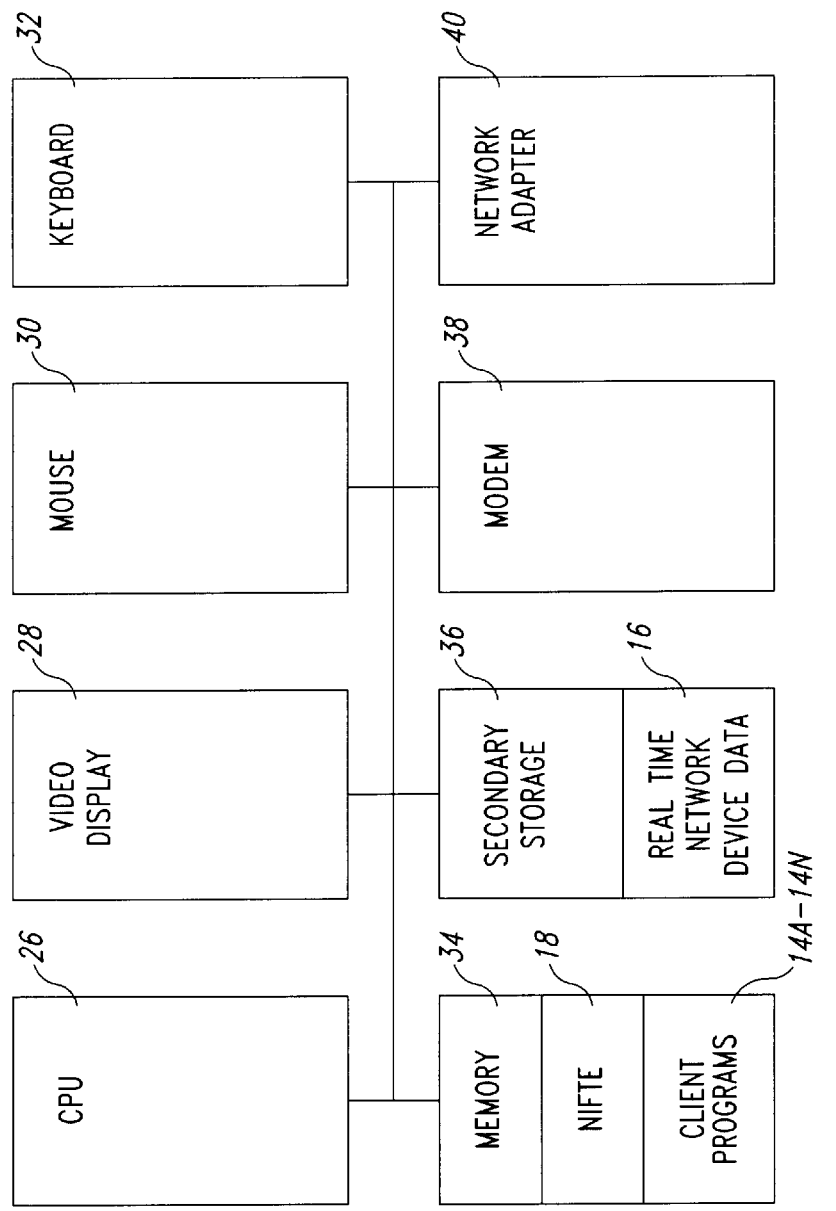
FIG. 2 is a block diagram illustrating the computer system of FIG. 1 in more detail.

FIG. 2 shows a computer system configuration that is suitable for the computer system 10 of FIG. 1. The computer system includes a central processing unit (CPU) 26 that communicates with a number of peripheral devices, including a video display 28, a mouse 30, and a keyboard 32. The CPU 26 also has access to a memory 34 and a secondary storage 36. Objects for implementing the NIFTE 18 are stored in the memory 34 along with the client application programs 14A–14N. The real-time network device data 16 may be stored within a secondary storage 36 or resident within the primary memory 34. The computer system 10 may further include a modem 38 for enabling the computer system to send communications and receive communications over a telephone line. The computer system 10 may also include a network adapter 40 for interfacing with a network having computing resources.

Those skilled in the art will appreciate that the computer system configuration depicted in FIG. 2 is intended to be merely illustrative and not limiting of the present invention. The present invention may be practiced with other computer system configurations. As was discussed above, the client programs 14A–14N and the NIFTE 18 may reside on different machines. Moreover, the computer system 10 may be implemented as a distributed computing system rather than a single processor or personal computer system.

Figure 3:
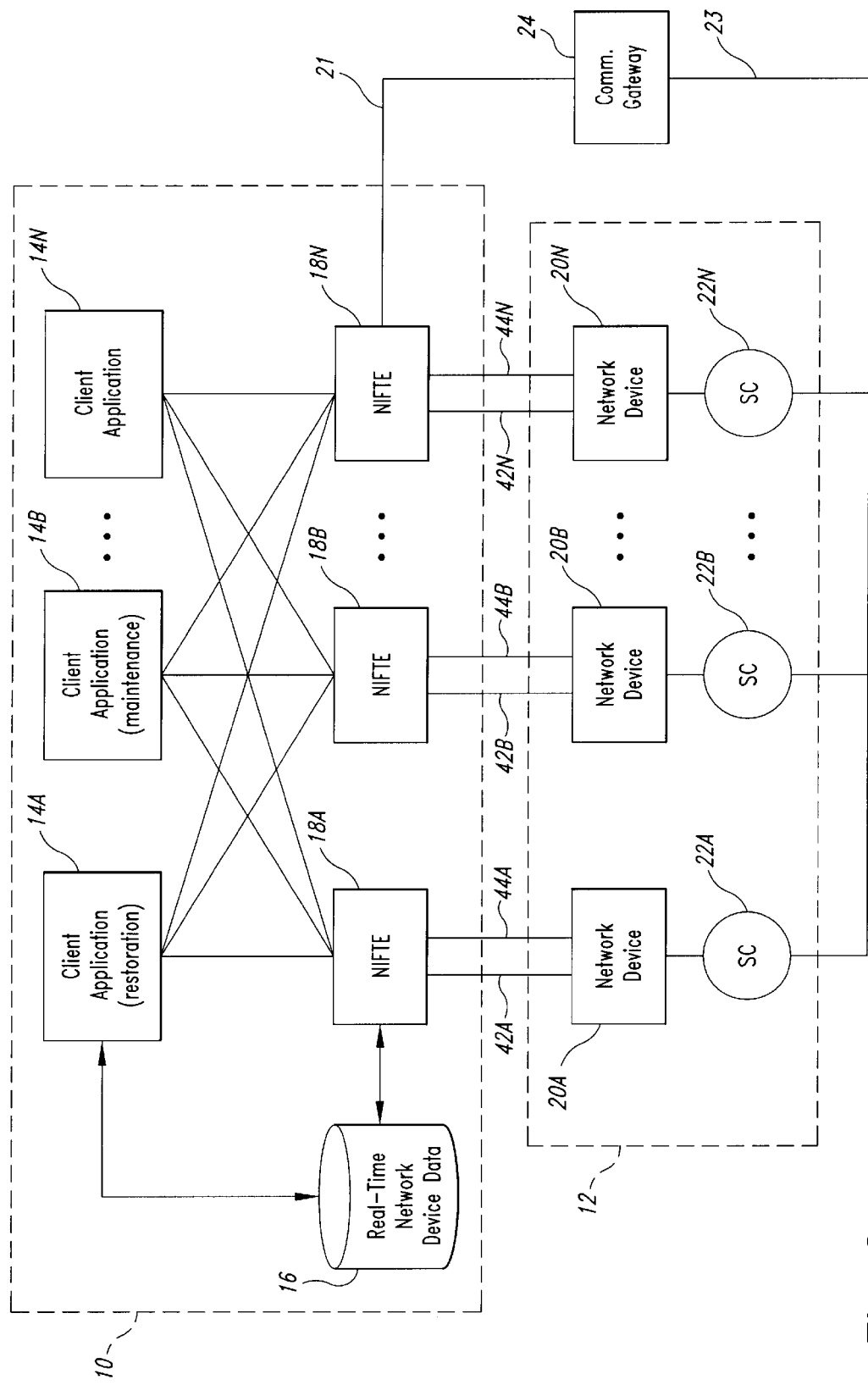
FIG. 3 is a block diagram of a portion of a telecommunications network that is suitable for practicing a second option in accordance with the present invention.

FIG. 3 depicts a second option under the present invention wherein multiple instances of the NIFTE are provided. In the embodiment depicted in FIG. 3, NIFTEs 18A–18N are provided such that each network device 20A–20N has its own corresponding NIFTE. Each instance of the NIFTE includes the same code but is implemented as a separate process by the computer system 10. Each client application program 14A–14N may communicate with a given network device 20A–20N via the NIFTE that is associated with the network device. As shown in FIG. 3, each client application program has a connection with each NIFTE. Moreover, each NIFTE has access to the real-time network device data database 16.

Each NIFTE 18A–18N is connected to its corresponding network device 20A–20N via two redundant data links 42A–42N and 44A–44N, which may be, for example, X.25 data links. Each such data link 42A–42N and 44A–44N is designated as being a primary link or a secondary link for the associated network device 20A–20N. Communications between the NIFTE 18A–18N and the network device 20A–20N are performed over one link at a time where the link that is not being used serves as a backup secondary link. For each link pair, the NIFTE designates one of the links as a primary link and the other link as a secondary link. Preferably, the NIFTE designates the more reliable link as the primary link. In general, when the NIFTE establishes communication with a network device 20A–20N, the connection request is sent over both links in the pair of links leading to a particular network device, and the first link to respond with a connection is designated as the primary link wherein the other link is designated as a secondary link. If a primary link fails, the NIFTE automatically shifts its communication to the designated secondary link and changes the designation of the link so that the secondary link is a new primary link.

It should be appreciated that each of the binary data links 42A–42N and 44A–44N may include multiple logical channels of communications. For instance, an Alcatel DXC device supports four logical channels per link. The number of logical channels may depend upon the type of network device.

As was mentioned above, the communication gateway 24 serves as a backup communication path in the event that the data links 42A–42N and 44A–44N for a particular network device 20A–20N fail.

Each NIFTE 18A–18N is capable of providing administrative and maintenance functions to the network devices 18A–18N. The maintenance system 14B generates commands to perform maintenance functions such as the enablement and disablement of binary links, the dynamic configuration of binary links, and the changing of internal configuration parameters. Each NIFTE may also generate automatic audits of network devices at periodic intervals.

Figure 4:
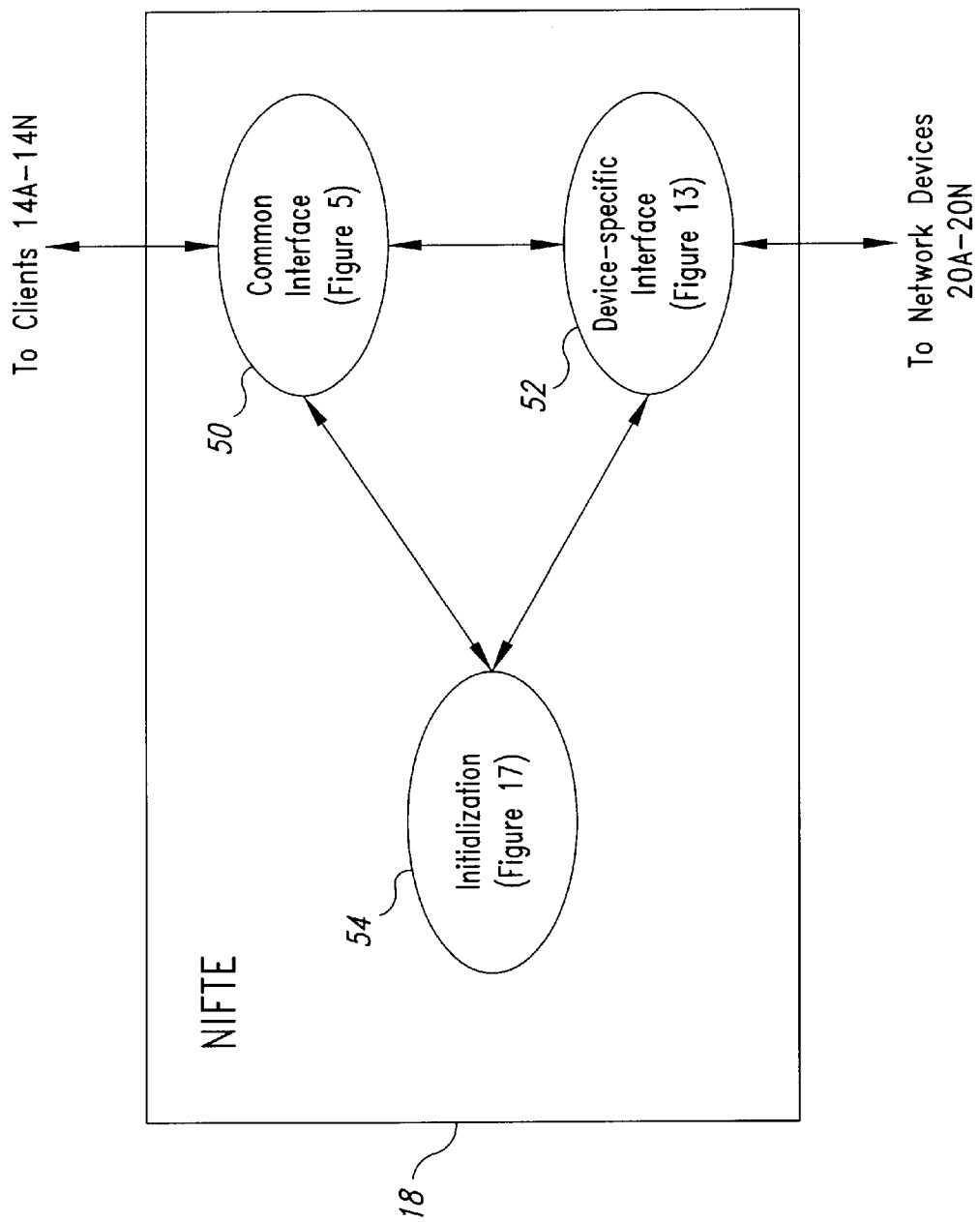
FIG. 4 illustrates the major components of the NIFTE of the exemplary embodiment of the present invention.

FIG. 4 depicts a high-level internal architectural diagram of the NIFTE 18. Each instance of a NIFTE 18 is comprised of three main software modules: a common interface module 50, a device-specific interface module 52, and an initialization module 54. The common interface module 50 is responsible for receiving commands from client application programs 14A–14N in a common format syntax. It communicates with the device-specific interface module 52 to forward commands to the network devices 20A–20N. In addition, the common interface module 50 receives responses to the commands from the network devices 20A–20N via the device-specific interface module 52 and forwards the responses in a converted format to the client application programs 14A–14N. The common interface module 50 performs automated auditing and administration by generating its own commands. The device-specific interface module 52 converts commands from the common format to a device-specific format that is required by the destination network device 20A–20N. The device-specific interface module 52 also receives responses from the network devices 20A–20N and converts the responses into the common format so that the responses may be forwarded to the appropriate client application programs 14A–14N via the common interface module 50. The initialization module 54 performs initialization upon the startup of the NIFTE 18. These functions include the initialization of binary data links 42A–42N and 44A–44N in determining network device configuration information.

Figure 5:
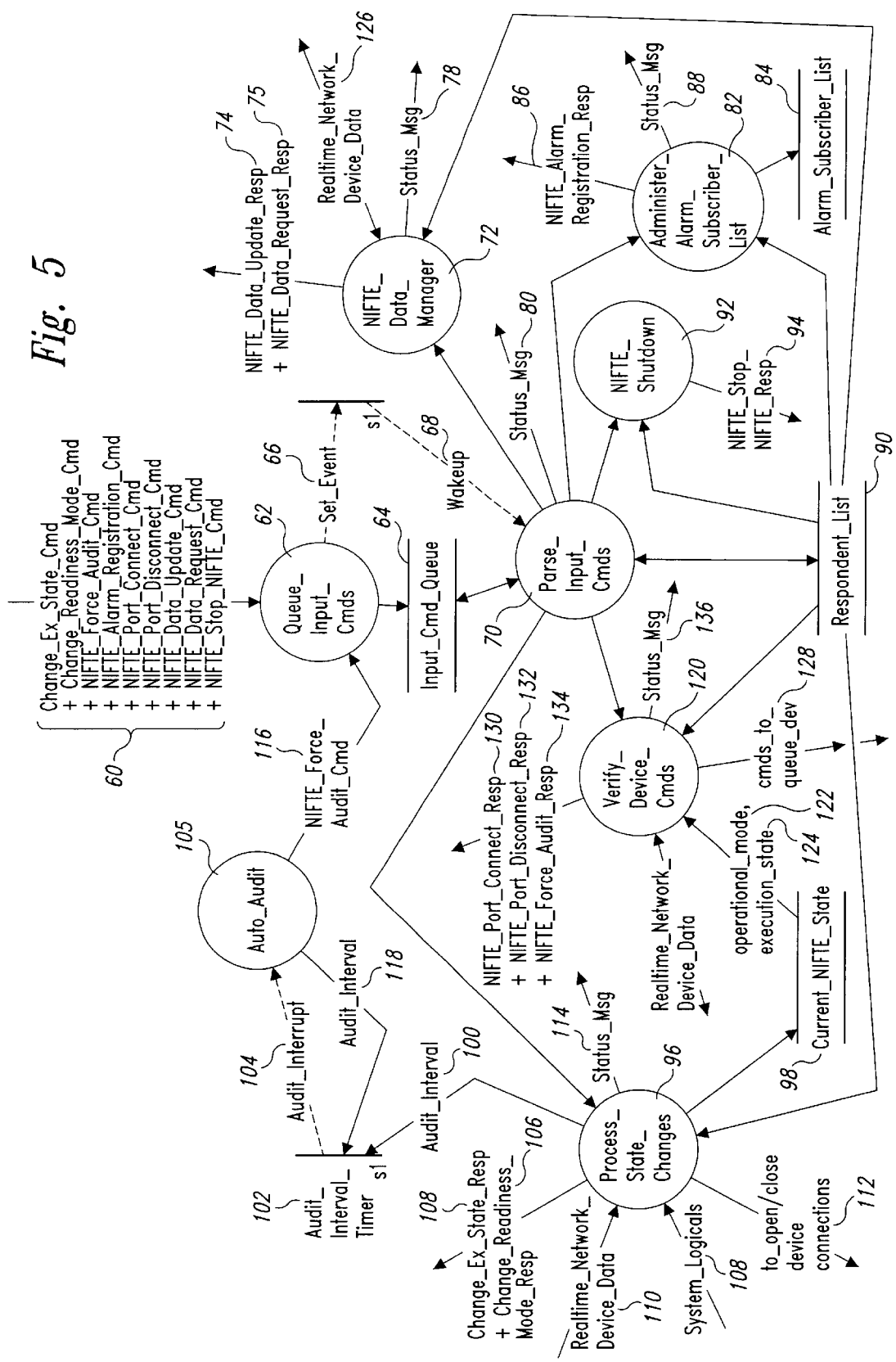
FIG. 5 is a data flow diagram for the common interface module of FIG. 4.

In the preferred embodiment, the common interface module 50 is implemented as a number of different objects. FIG. 5 is a data flow diagram that shows data flow among the respective objects of the common interface module 50. The discussion below details the functions performed by these objects. The Queue_Input_Cmds object 62 is responsible for receiving commands from the client application programs 14A–14N and queuing these commands for distribution to other objects within the common interface module 50. As can be seen in FIG. 5, the commands 60 received by the Queue_Input_Cmds object 62 are placed in the Input_Cmd_Queue 64. The following commands may be received at the Queue_Input_Cmds object 62.

Change_Ex_State_Cmd
    Change_Readiness_Mode_Cmd
    NIFTE_Force_Audit_Cmd
    NIFTE_Alarm_Registration_Cmd
    NIFTE_Port_Connect_Cmd
    NIFTE_Port_Disconnect_Cmd
    NIFTE_Data_Update_Cmd
    NIFTE_Stop_NIFTE_Cmd The Change_Ex_State_Cmd command is responsible for changing the execution state of the NIFTE 18. The execution state will be described in more detail below. The Change_Readiness_Mode_Cmd command changes the readiness mode of the NIFTE 18. The readiness mode will also be described in more detail below. The NIFTE_Force_

Audit_Cmd command causes an audit of a network device to be initiated. The NIFTE_Alarm_Registration_Cmd command requests that certain unsolicited alarms originating from the network devices 20A–20N be sent to a client application program. The NIFTE_Port_Connect_Cmd command instructs a network device 20A–20N to connect a port. Conversely, the NIFTE_Port_Disconnect_Cmd command instructs the network device to disconnect a port. The NIFTE_Data_Update_Cmd command updates data within the NIFTE's internal configuration or within the real-time network device data. The NIFTE_Data_Request_Cmd command requests that data be retrieved either from the NIFTE's internal configuration or from the real-time network device data. Lastly, the NIFTE_Stop_NIFTE_Cmd command causes the NIFTE 18 to shut down.

Figure 6:
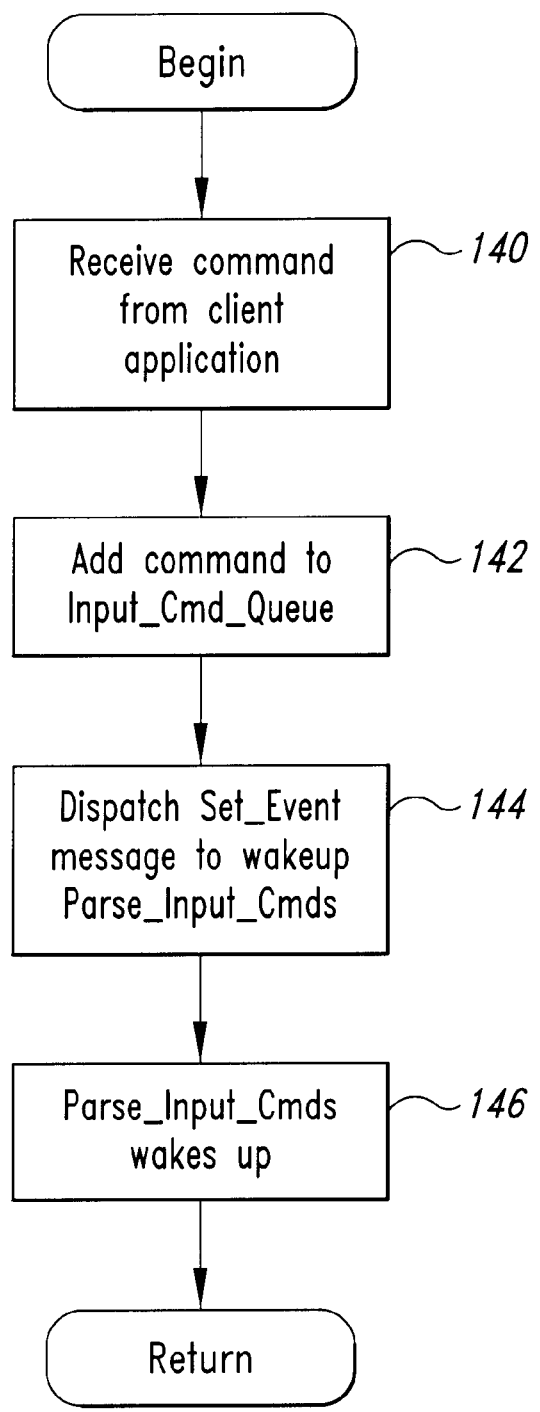
FIG. 6 is a flow chart illustrating the steps that are performed by the Queue_Input_Cmds object of FIG. 5.

FIG. 6 is a flowchart illustrating the steps that are performed when one of the above-described commands is received by the Queue_Input_Cmds object 62. Initially, the command is received from one of the client application programs 14A–14N (step 140 in FIG. 6). The Queue_Input_Cmds object 62 then adds the received command to the Input_Cmd_Queue 64 (step 142 in FIG. 6). Upon receipt of the command, the Queue_Input_Cmds object 62 also dispatches a Set_Event message 66 to wake up 68 the Parse_Input_Cmds object 70 (step 144 in FIG. 6). The dispatching of the Set_Event message 66 causes a wake up 68 of the Parse_Input_Cmds object 70 (step 146 in FIG. 6).

Figure 7:
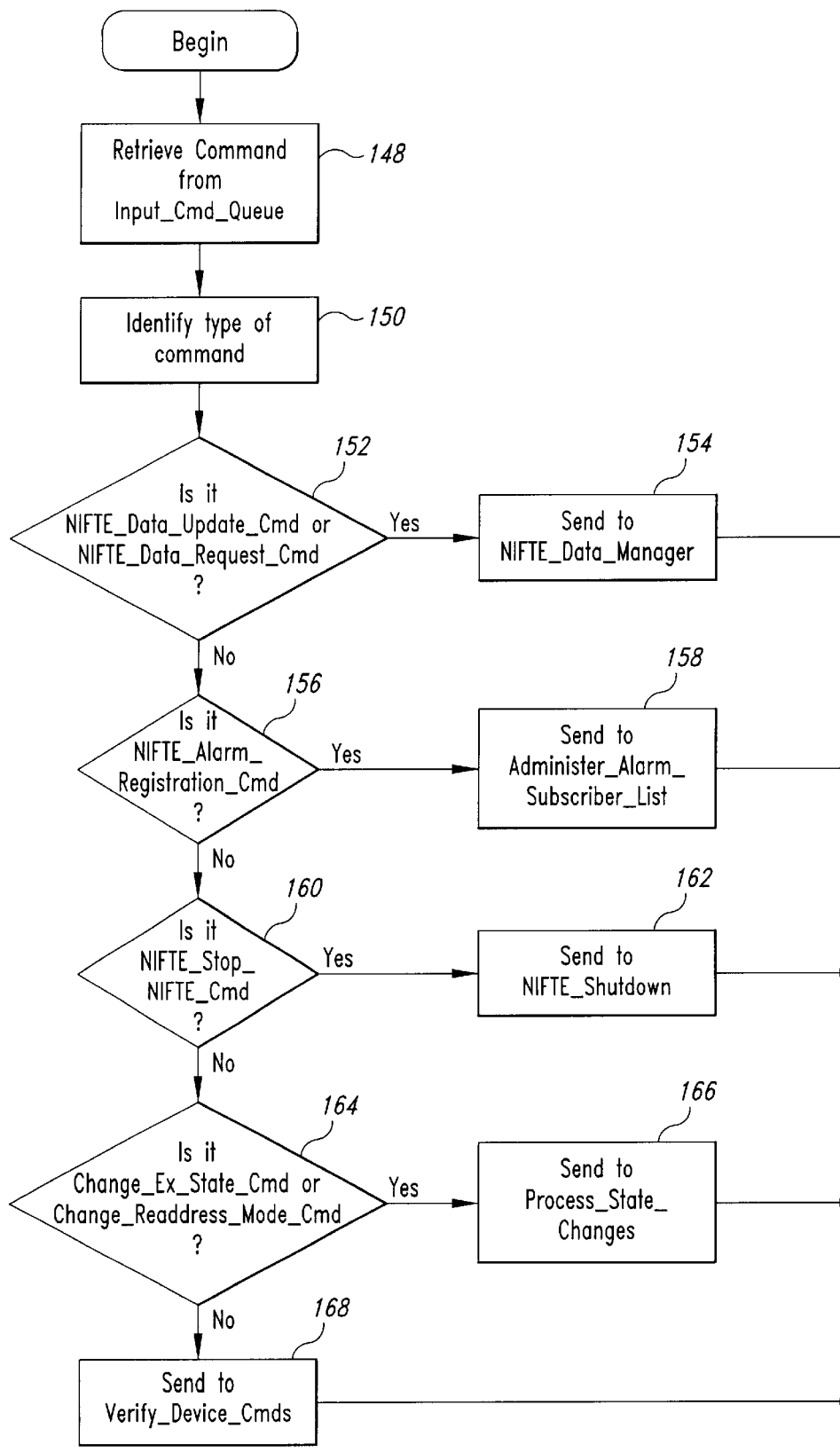
FIG. 7 is a flow chart illustrating the steps performed by the Parse_Input_Cmds object of FIG. 5.

The Parse_Input_Cmds object 70 is responsible for distributing commands that are stored in the Input_Cmd_Queue 64 to the appropriate destination objects. FIG. 7 is a flowchart of the steps performed for a single retrieve command by the Parse_Input_Cmds object 70. Initially, the Parse_Input_Cmds object 70 retrieves a command from Input_Cmd_Queue 64 (step 148 in FIG. 7). The Parse_Input_Cmds object 70 then identifies the type of the command (step 150 in FIG. 7). Based upon the type of command, the Parse_Input_Cmds object 70 determines where to distribute the command for proper processing. If the command is a NIFTE_Data_Update_Cmd command or a NIFTE_Data_Request_Cmd command (see step 152 in FIG. 7), the Parse_Input_Cmds object sends the command to the NIFTE_Data_Manager object 72 (step 154 in FIG. 7). If the command is the NIFTE_Alarm_Registration_Cmd command (see step 156 in FIG. 7), the Parse_Input_Cmds object 70 sends the command NIFTE_Alarm_Registration_Cmd to the Administer_Alarm_Subscriber_List object 82 (step 158 in FIG. 7). If the command is a NIFTE_Stop_NIFTE_Cmd command (see step 160 in FIG. 7), the Parse_Input_Cmds object 70 sends the command to the NIFTE_Shutdown object 92 (step 162 in FIG. 7). If the command is a Change_Ex_State_Cmd command or a Change_Readiness_Mode_Cmd command (see step 164 in FIG. 7), then the command is sent to the Process_State_Changes object 96 (step 166 in FIG. 7). If the command is a NIFTE_Force_Audit_Cmd command, a NIFTE_Port_Connect_Cmd command or a NIFTE_Port_Disconnect_Cmd command, the command is sent to the Verify_Device_Cmds object 120 (step 168 in FIG. 7).

Figure 8:
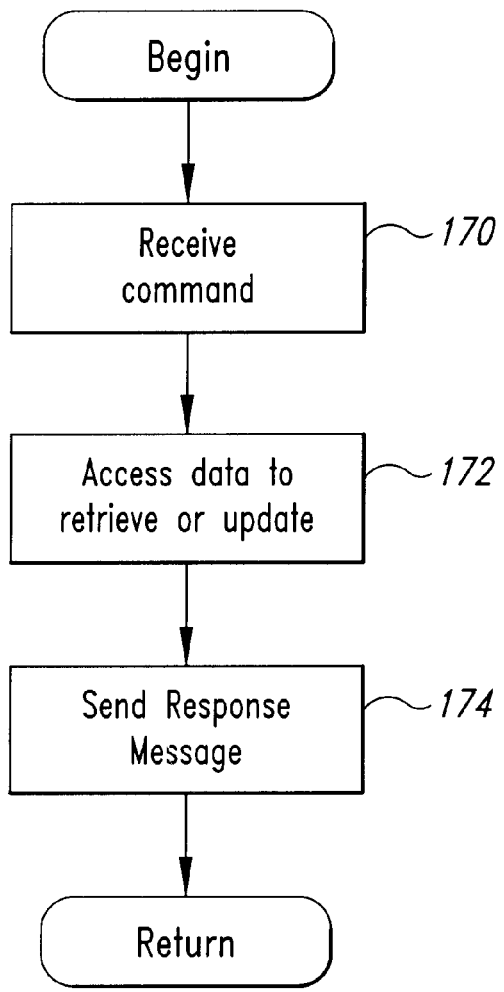
FIG. 8 is a flow chart illustrating the steps that are performed by the NIFTE_Data_Manager object of FIG. 5.

As was discussed above, NIFTE_Data_Update_Cmd commands and NIFTE_Data_Request_Cmd commands get sent to the NIFTE_Data_Manager object 72. FIG. 8 is a flowchart of the steps performed by this object. Initially, the NIFTE_Data_Manager object 72 receives the command from the Parse_Input_Cmds object 70 (step 170 in FIG. 8). The NIFTE_Data_Manager object 72 then accesses the data to update or retrieve the data, depending upon the command (step 172 in FIG. 8). If the data update or request is for internal NIFTE configuration information, the NIFTE_Data_Manager object 72 will access the NIFTE's internal data tables to make the update. If the request or update is not for internal NIFTE configuration information, the RealTime_Network_Device_Data 126 is accessed from the real-time network device data database 16 (FIG. 1) to gain access to the appropriate data. The NIFTE_Data_Manager object 72 then sends a response to the client application program 14A–14N that sent the command (step 174 in FIG. 8). A NIFTE_Data_Update_Resp response 74 is sent for each NIFTE_Data_Update_Cmd command that is received, and a NIFTE_Data_Request_Resp response 75 is sent for each NIFTE_Data_Request_Cmd command that is received. In addition, data is returned in response to the NIFTE_Data_Request_Cmd. The responses 74 and 75 confirm that the corresponding command was received and processed. In generating these responses 74 and 75, the NIFTE_Data_Manager object 72 uses a Respondent_List 90 that holds a list of all client application programs 14A–14N and the logical addresses for such client application programs.

The NIFTE_Data_Manager object 72 may generate a status message (Status_Msg) 78 from time to time when certain qualifying events are performed or detected. Examples of qualifying events include detection of an error or completion of a task that a user wishes to know about. Such status messages are kept in an internal log for the NIFTE 18 and are available to users to view a report. Other objects within the common interface module 50 (FIG. 4) also generate such status messages. For example, the Parse_Input_Cmds object 70 generates a Status_Msg message 80 when qualifying events occur.

Figure 9:
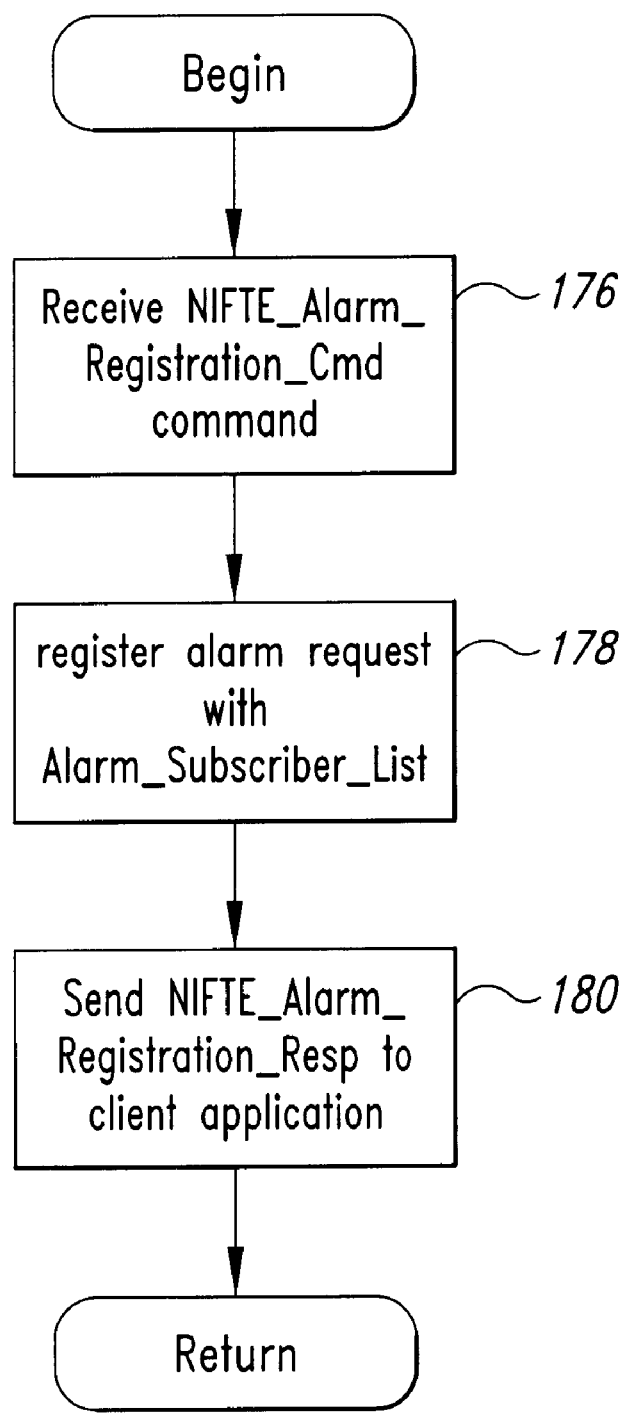
FIG. 9 is a flow chart illustrating the steps that are performed by the Administer_Alarm_Subscriber_List object of FIG. 5.

FIG. 9 depicts the steps that are performed by the Administer_Alarm_Subscriber_List. FIG. 9 is a flowchart illustrating the steps performed by the Administer_Alarm_Subscriber_List object 82 when it receives a NIFTE_Alarm_Registration_Cmd command from the Parse_Input_Cmds object 70. Initially, the command is received (step 176 in FIG. 9). The Administer_Alarm_Subscriber_List object 82 then registers the alarm request with the Alarm_Subscriber_List 84 (step 178 in FIG. 9). The NIFTE_Alarm_Registration_Cmd commands are sent to the Administer_Alarm_Subscriber_List object 82 for a client application program to register unsolicited alarms such that the client application program receives alarms from the network devices 20A–20N that would not usually be forwarded to the client application programs. The Alarm_Subscriber_List 84 is a list of client application programs that are registered by request to receive unsolicited alarms, and the list is updated and maintained by the Administer_Alarm_Subscriber_List object 82. The Administer_Alarm_Subscriber_List object 82 generates a response, NIFTE_Alarm_Registration_Resp 86 to the registered client application programs 14A–14N (step 180 in FIG. 9). The response confirms that the alarm registration command was received and processed. The Administer_Alarm_Subscriber_List object 82 uses the Respondent_List 90 to locate the name and address of the client application program to which the response is sent.

Like other objects in the common interface module 50, the Administer_Alarm_Subscriber_List object 82 will generate a Status_Message 88 when certain triggering events occur.

Figure 10:
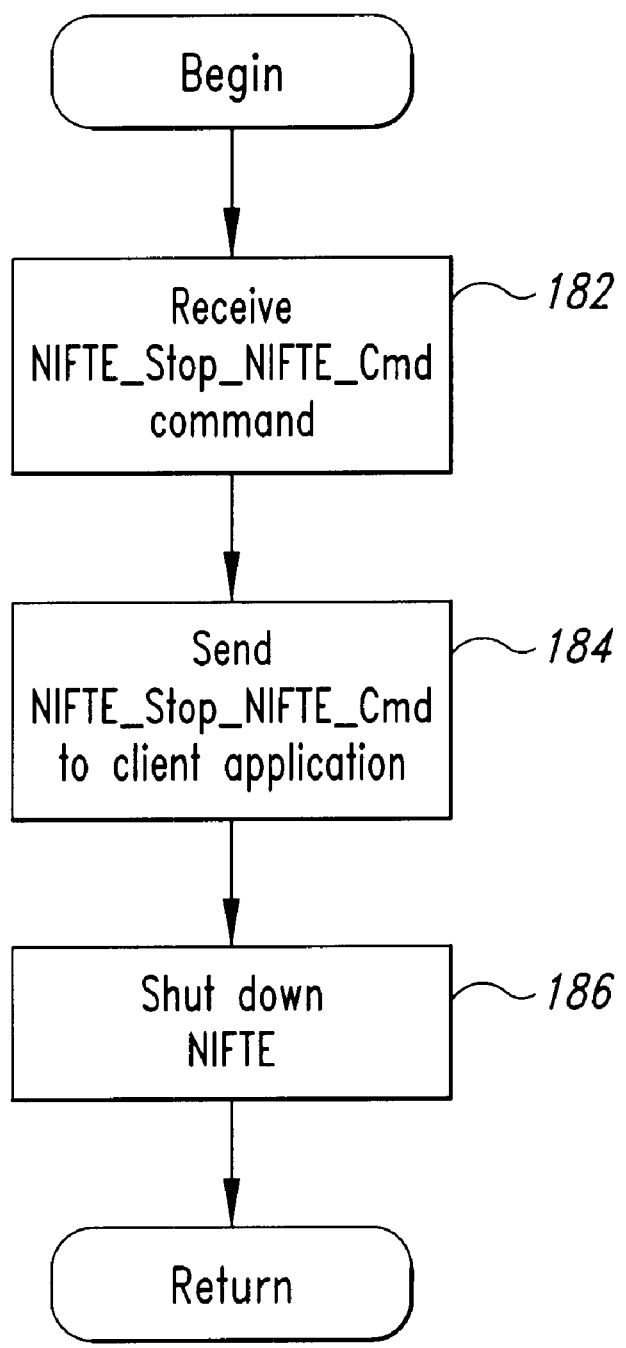
FIG. 10 is a flow chart illustrating the steps that are performed by the NIFTE_Shutdown object of FIG. 5.

The NIFTE_Shutdown object 92 may receive NIFTE_Stop_NIFTE_Cmd commands from the Parse_Input_Cmds object 70. FIG. 10 is a flowchart illustrating the steps that are performed in such an instance. Initially, the NIFTE_

Shutdown object 97 receives the NIFTE_Stop_NIFTE_Cmd command (step 182 in FIG. 10). The NIFTE_Shutdown object 92 generates a response (i.e., NIFTE_Stop_NIFTE_Resp 94) that it sends to the client application program 14A–14N that initiated the command (step 184 in FIG. 10). The NIFTE_Shutdown object 92 then proceeds to shutdown the NIFTE (step 186 in FIG. 10).

Each NIFTE operates in one of two execution states: primary or backup. To enhance fault tolerance, the preferred embodiment provides two instances of the NIFTE; one that serves as the active or primary NIFTE and one that serves as backup NIFTE. Preferably, these instances of the NIFTE are run on separate computer systems. When a NIFTE transitions from the primary execution state to the backup execution state, the NIFTE closes its communications with the rest of the network and brings down its binary links 42A–42N and 44A–44N. While the NIFTE transitions from the backup execution state to the primary execution state, the NIFTE opens its binary links 42A–42N and 44A–44N and begins communications. Such transitions in execution state are triggered by a Change_Ex_State_Cmd command.

The primary NIFTE 18 may also operate in one of two readiness modes: normal and alert. The normal mode is the nominal mode of operation in which the NIFTE performs route auditing, administration, and other functions. When unsolicited alarms are received that indicate a network outage, the restoration system application program 14A sends a Change_Readiness_Mode_Cmd command to the NIFTE. This command triggers a change in the readiness mode such that the NIFTE transitions to the alert readiness mode. In the alert readiness mode, all auditing and background processing ceases, and the NIFTE 18 stands ready to receive and process NIFTE_Port_Connect_Cmd and NIFTE_Port_Disconnect_Cmd commands from the restoration 14A.

Figure 11A:
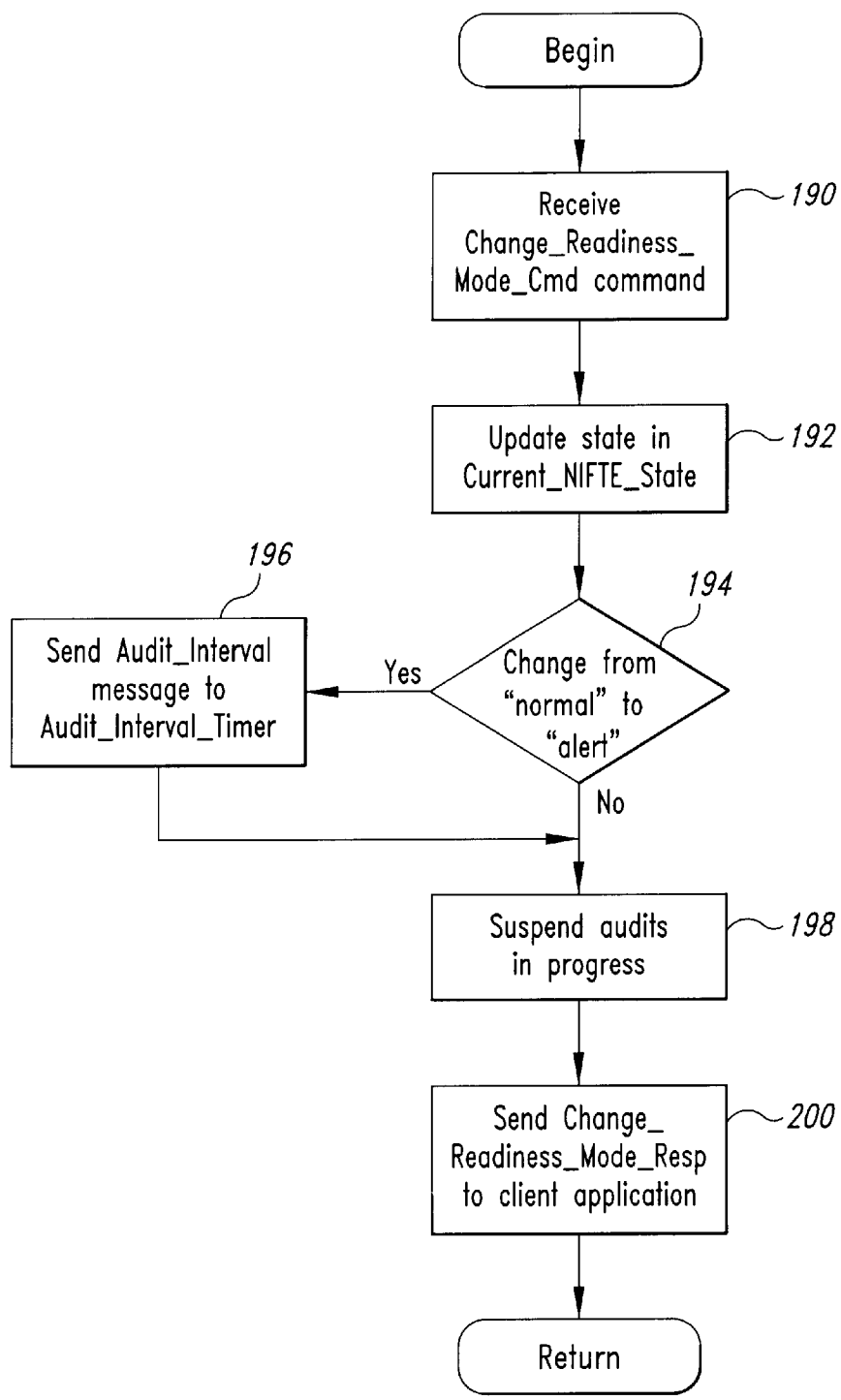
FIG. 11A is a flow chart illustrating the steps that are performed by the Process_State_Changes object of FIG. 5 when it receives a Change_Readiness_Mode_Cmd command.

FIG. 11A illustrates the steps that are performed by the Process_State_Changes object 96 when it receives a Change_Readiness_Mode_Cmd command. Initially, the command is received at the Process_State_Changes object 96 (step 190 in FIG. 11A). The Process_State_Changes object 96 then updates the state that is held in the Current_NIFTE_State 98 to reflect the change in readiness mode state. If the readiness mode state is changing from normal to alert (see step 194 in FIG. 11A), the Process_State_Changes object 96 sends an Audit_Interval message 100 to the Audit_Interval_Timer 102 to cease all automatic auditing operations, which are described in more detail below (step 196 in FIG. 11A). When the change is from the normal state to the alert state or vice versa, the Process_State_Changes object 96 proceeds to suspend all audits that are currently in progress (step 198 in FIG. 11A).

Incomplete initial device audits that are performed during initialization, however, are not suspended. The Process_State_Changes object 96 then sends a Change_Readiness_Mode_Resp response 106 to the client application program that sent the initial command (step 200 in FIG. 11A).

Figure 11B:
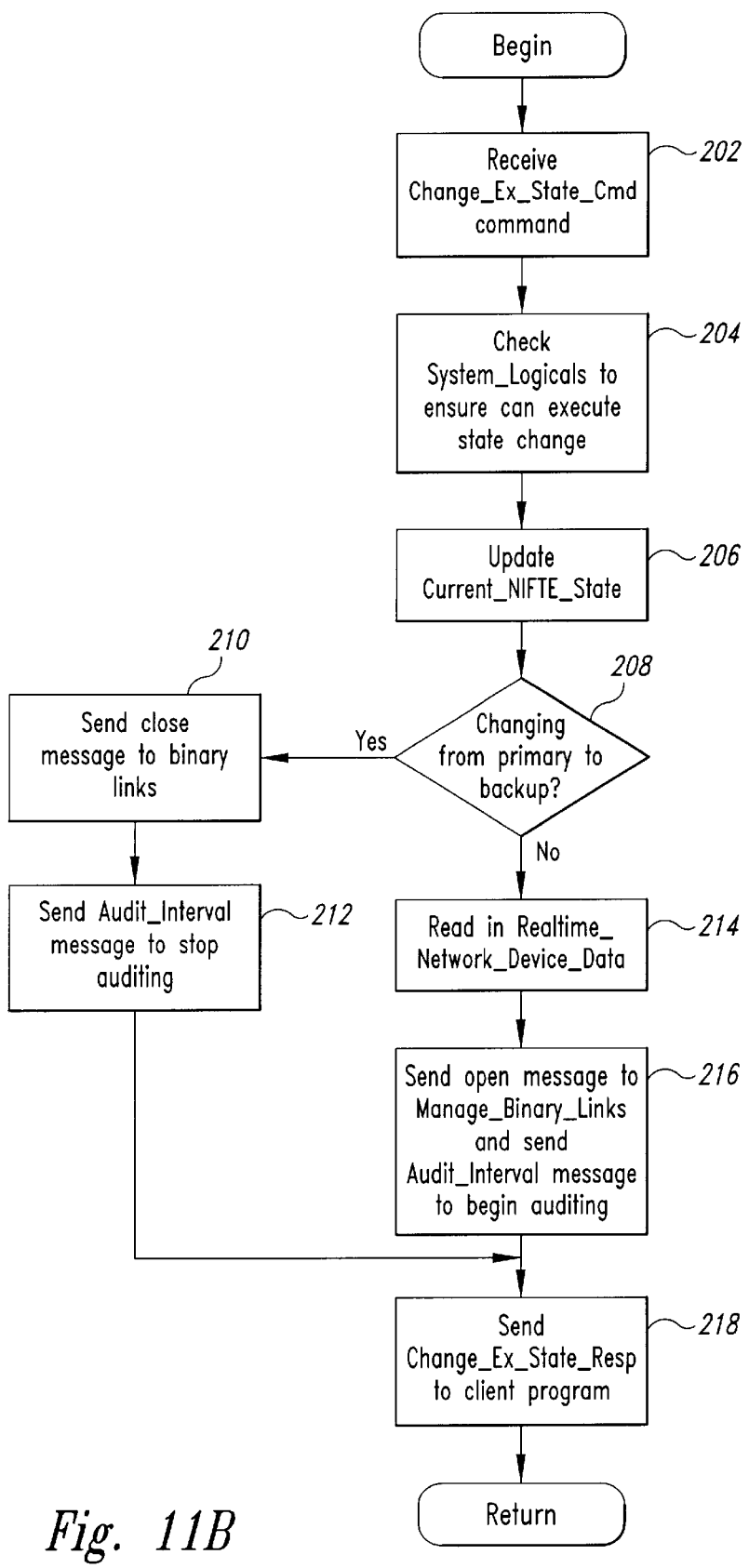
FIG. 11B is a flow chart illustrating the steps that are performed by the Process_State_Changes object of FIG. 5 when it receives a Change_Ex_State_Cmd command.

FIG. 11B shows the steps that are performed by the Process_State_Changes object 96 when a Change_Ex_State_Cmd command is received. Initially, the object receives the Change Ex_State_Cmd command (step 202 in FIG. 11B). The Process_State_Changes object 96 then checks the System_Logicals 108, which constitutes data from the operating system of the computer that indicates status and performance conditions of the computer, to ensure that the state change may be executed (step 204 in FIG. 11B). The state held in Current_NIFTE_State 98 is then modified to note the change in execution state (step 206 in FIG. 11B). If the command is for a change in execution state from primary to backup (see step 208 in FIG. 11B), commands 112 are sent to the binary links to close the binary links (step 210 in FIG. 11B). In addition, an Audit_Interval message 100 is sent to the Audit_Interval_Timer 102 to stop automated auditing (step 212 in FIG. 11B). In this case, the Process_State_Changes object 96 then sends a Change_Ex_State_Resp response 108 to the client application program that sent the initial command (step 218 in FIG. 11B).

If the command for a change from backup to primary (see step 208 in FIG. 11B), the Process_State_Changes object 96 reads in the Realtime_Network_Device_Data 110 to obtain information that will be needed to open the binary links 42A–42N and 44A–44N (step 214 in FIG. 11B). A command 112 is then sent to open the binary links and an Audit_Interval message 100 is sent to the Audit_Interval_Timer 102 to initiate automatic auditing (step 216 in FIG. 11B). A Change_Ex_State_Resp response 108 is sent to the client application program that sent the initial command (step 218 in FIG. 11B).

The Process_State_Changes object 96 generates a Status_Msg message 114 when certain events are triggered.

The Auto_Audit object 105 performs an automated auditing process for the NIFTE 18. The auditing process automatically generates NIFTE_Force_Audit_Cmd commands 116 at specified time intervals. These commands are sent to various ones of the network devices 20A–20N. The commands trigger response from the network devices 20A–20N such that the devices specify their internal configuration.

The Audit_Interval_Timer 102 triggers execution of the sending of such NIFTE_Force_Audit_Cmd commands 116. The timer 102 sends Audit_Interrupt messages 104 to the Auto_Audit object 105 to cause the Auto_Audit object to generate the NIFTE_Force_Audit_Cmd commands. Such commands are forwarded to the Queue_Input_Cmds object 62. After generating such a command, the Auto_Audit object 105 resets the Audit_Interval_Timer 102 by sending an Audit_Interval message.

The Verify_Device_Cmds object 120 receives and processes commands to connect ports, disconnect ports, and force audits from the Parse_Input_Cmds object 70. Specifically, the Verify_Device_Cmds object 120 receives NIFTE_Port_Connect_Cmd, NIFTE_Port_Disconnect_Cmd, and NIFTE_Force_Audit_Cmd commands from the Parse_Input_Cmds object 70. The Verify_Device_Cmds object 120 verifies that commands of the type it receives include the proper arguments and can be currently processed by device-specific interfaces.

Figure 12:
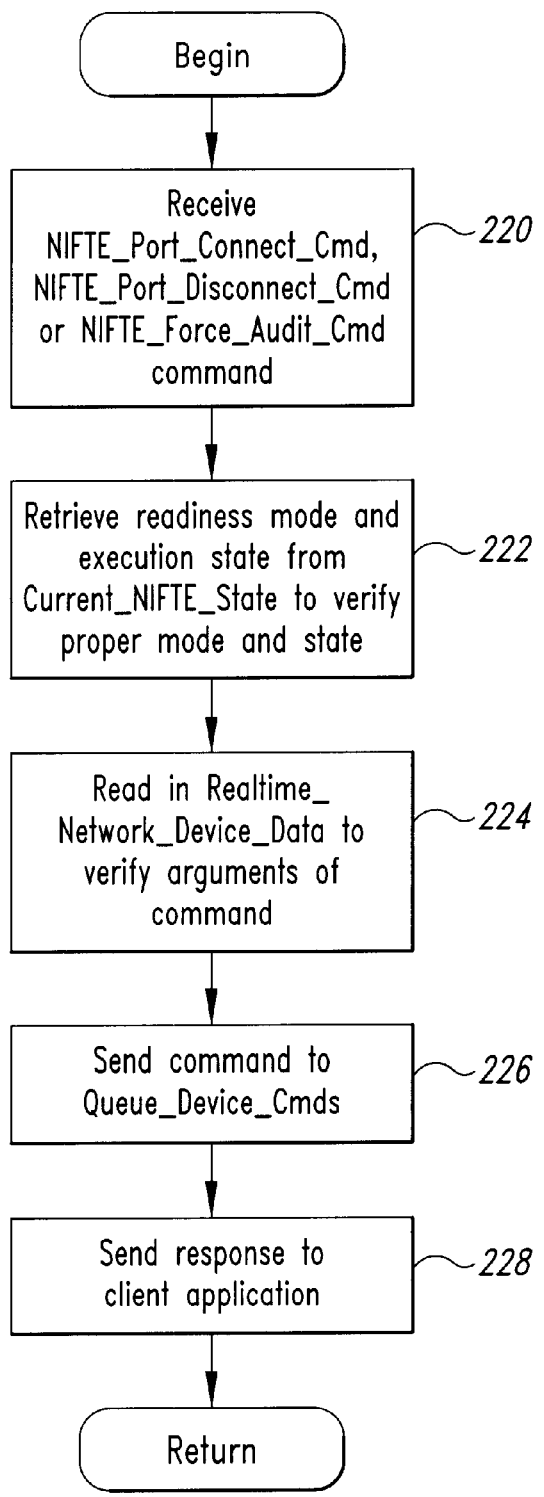
FIG. 12 is a flow chart illustrating the steps that are performed by the Verify_Device_Cmds object of FIG. 5.

FIG. 12 is a flow chart of the steps performed by the Verify_Device_Cmds object 120 in processing received commands. Initially, the Verify_Device_Cmds object 120 receives a port connect, port disconnect, or force audit command (step 220 in FIG. 12). The Verify_Device_Cmds object 120 then accesses the Current_NIFTE_State to ensure that the current operational mode 122 and execution state 124 are proper for processing of the command (step 222 in FIG. 12). For example, for the port connect and port disconnect commands, the appropriate execution state is the primary execution state and either readiness mode is acceptable. However, with the force audit command, the proper execution state is the primary execution state and the proper readiness mode is the normal mode. If the proper mode and state cannot be verified, the command is not further processed. If the proper operational mode 122 and execution state 124 have been verified in step 222 in FIG. 12, the Realtime_Network_Device_Data 126 is read in to verify arguments of the command (step 224 in FIG. 12). For example, for the port connect and port disconnect commands, the port range specified in the commands must be valid. The data is also used to obtain a network address for the network device 20A–20N to which the command is destined. If the arguments are verified, the command 128 is sent to the Queue_Device_Cmds object (which will be discussed in more detail below) for processing by the device-specific interface module (step 226 in FIG. 12). The Verify_Device_Cmds object 120 then sends an appropriate response 130, 132, or 134 to the client application program that initiated the command (step 228 in FIG. 12). If the command cannot be sent to the device-specific interface module for some reason, the Verify_Device_Cmds object 120 sends a response message indicating the inability to send the command. If the command is successfully sent; however, a response is sent to the client application program 14A–14N when the response is received from the network device 20A–20N.

Figure 13A:
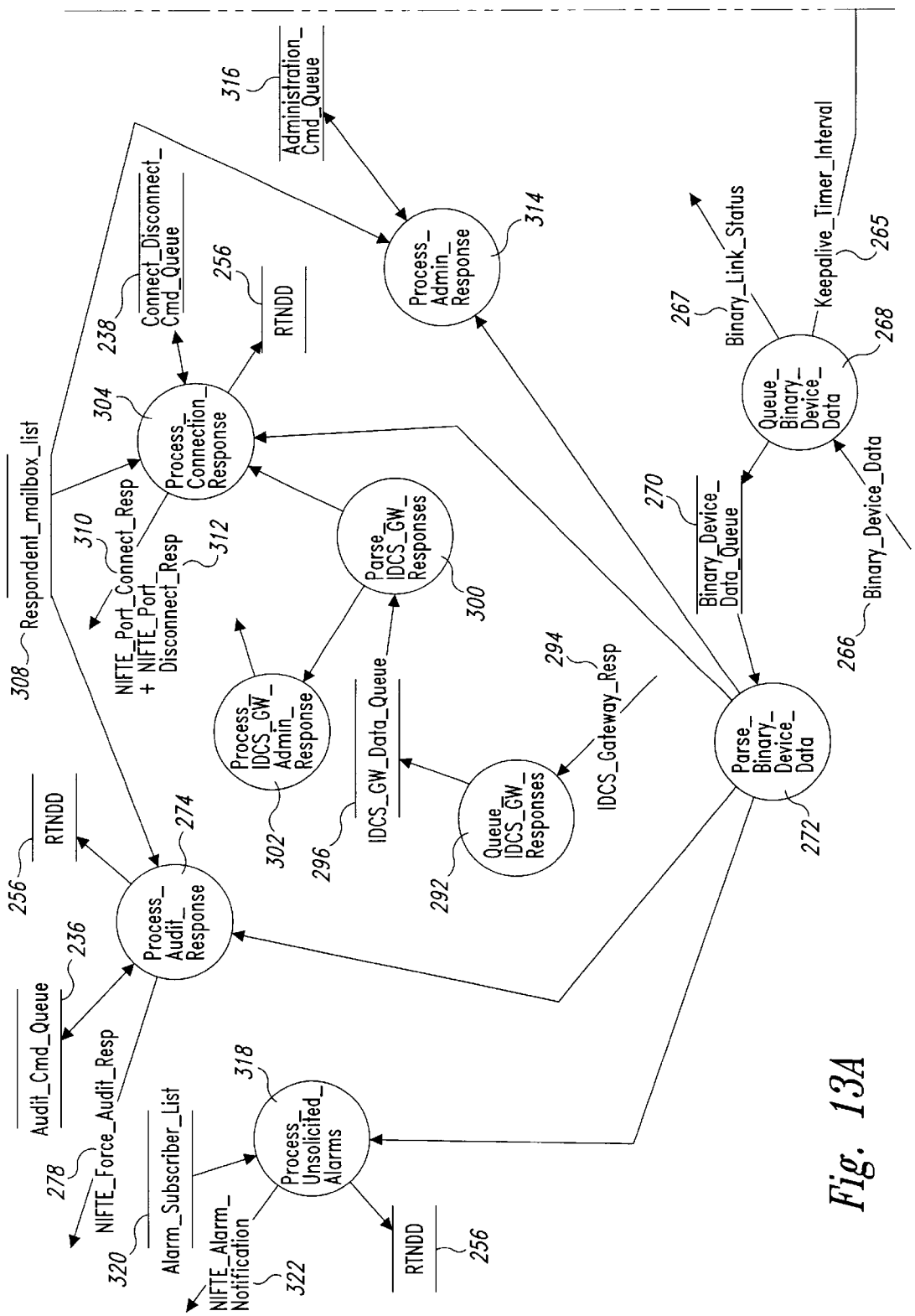
FIG. 13 is a data flow diagram for the components of the device-specific interface module of FIG. 4.
Figure 13B:
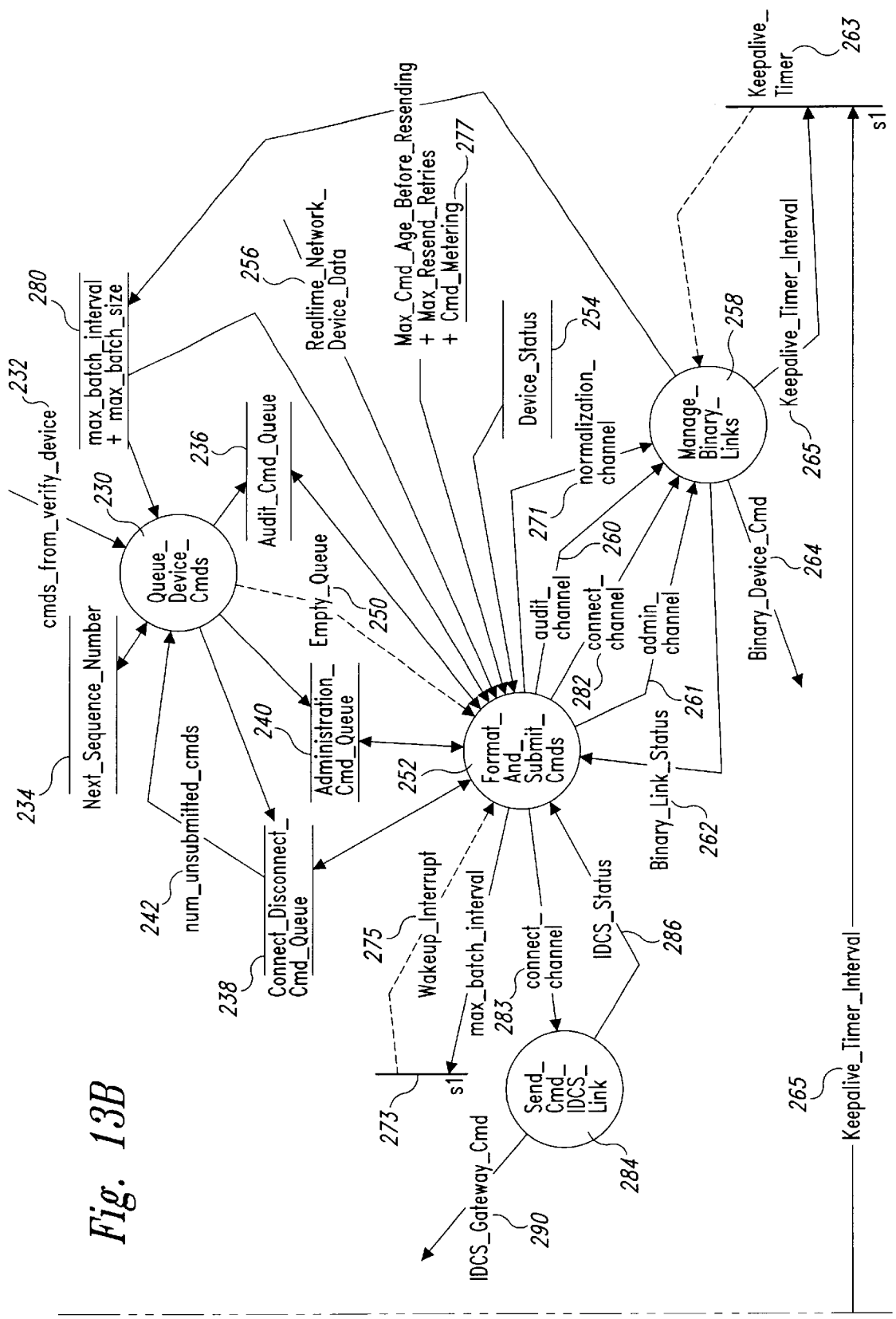

FIG. 13 illustrates the architecture of the device-specific interface module 52 (FIG. 4) in more detail. In particular, FIG. 13 depicts a data flow diagram showing the data flow among the objects that comprise-specific interface module 52. As was discussed above, the device-specific interface module 52 receives client commands from the common interface module 50 in the common format and converts the commands into formats that are specific to destination network devices 20A–20N. The converted commands are forwarded to the destination network devices 20A–20N using the data links 42A–42N or 44A–44N. The device-specific interface module 52 receives responses and unsolicited messages from the network devices 20A–20N and converts the responses and messages into a common format. The device-specific interface module 52 is additionally responsible for managing the binary data links 42A–42N and 44A–44N.

Figure 14A:
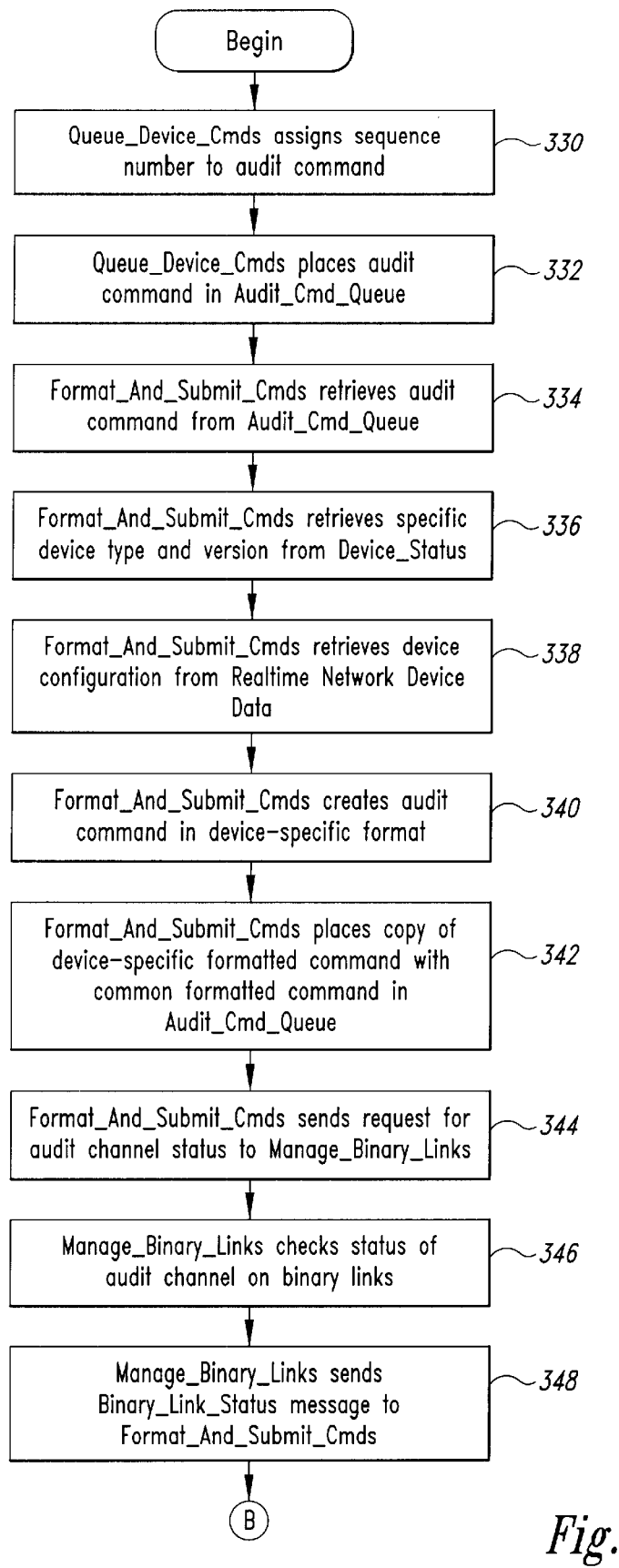
FIGS. 14A and 14B depict a flow chart of the steps performed by the device-specific interface when an audit command is received.
Figure 14B:
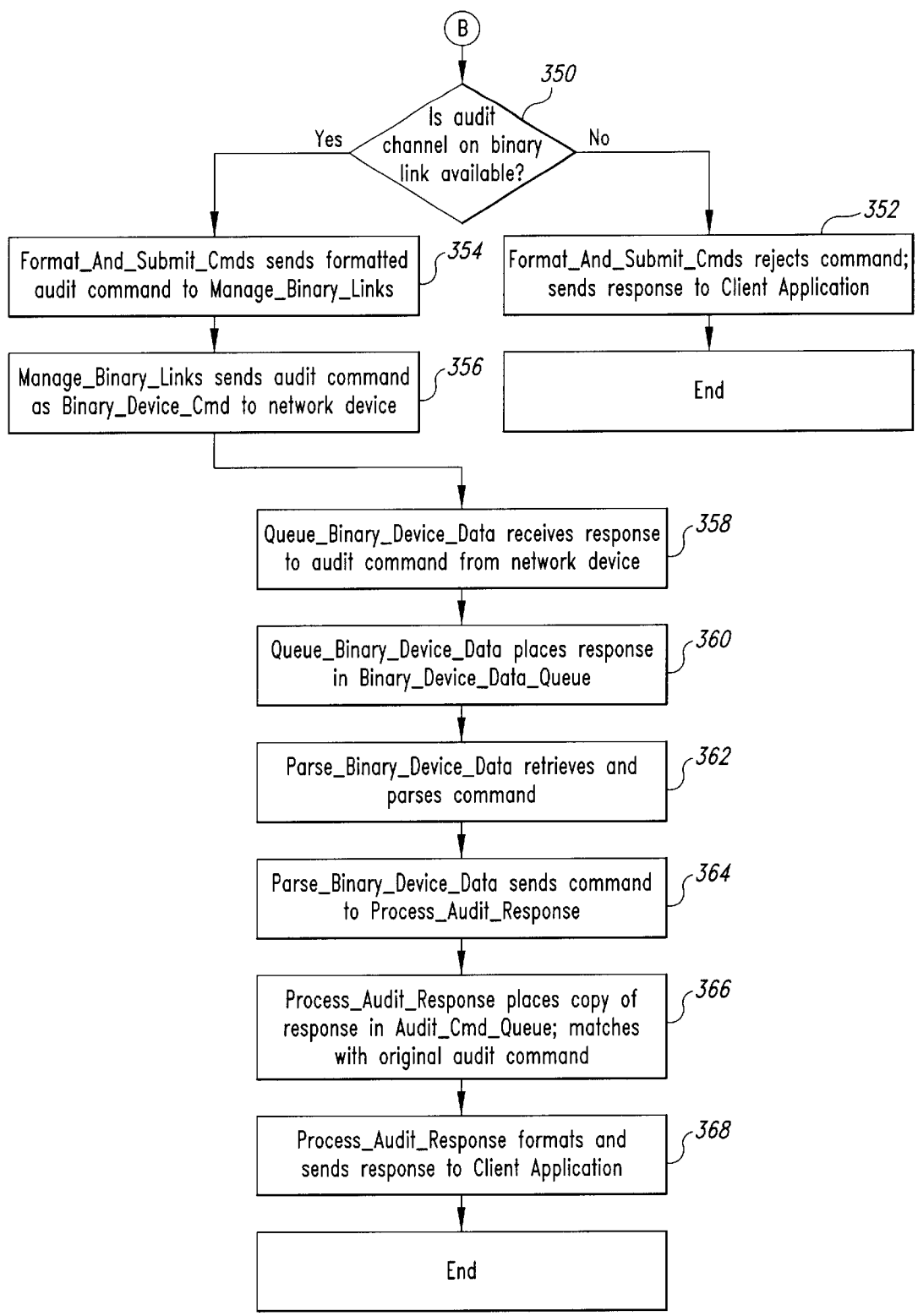

Among the objects in the device-specific interface module 52 is the Queue_Device_Cmds object 230. This object is responsible for enqueing the device commands into appropriate queues. The discussion below will focus on the steps that are performed when different types of commands are received by the Queue_Device_Cmds object 230. FIGS. 14A and 14B illustrates the steps that are performed when an audit command is received by the Queue_Device_Cmds object 230. Initially, the Queue_Device_Cmds object 230 assigns a sequence number to the audit command that uniquely identifies the instance of the command (step 330 in FIG. 14A). The sequence numbers are obtained from the Next_Sequence_Number server 234, which is maintained internally by the NIFTE 18. Since the command is an audit command, the Queue_Device_Cmds object 230 places the audit command in the Audit_Cmd_Queue 236 (step 332 in FIG. 14A). Subsequently, the Format_And_Submit_Cmds object 252 retrieves the audit command from Audit_Cmd_ Queue 236 (step 334 in FIG. 14A). The Format_And_ Submit_Cmds object 52 retrieves commands from various queues and converts the commands from the common format used by the client application programs 14A–14N to the device-specific formats used by the network devices 20A–20N.

The Format_And_Submit_Cmds object 252 then retrieves specific device-type information about the destination device and version information from the Device_ Status file 254 (step 336 in FIG. 14A). The Device_Status file 254 holds information regarding device type and version information for each of the network devices 20A–20N. The Format_And_Submit_Cmds object 252 retrieves device configuration information about the destination network device from the Realtime_Network_Device_Data 256 that is stored in the real-time network device data database 16 (FIG. 1) to verify that the destination network device is properly configured and can receive the command (step 338 in FIG. 14A). The Format_And_Submit_Cmds object 252 proceeds to create an audit command in the device-specific format (step 340 in FIG. 14A). A copy of the device-specific command is then placed in the Audit_Cmd_Queue 236 (step 342 in FIG. 14A).

The Format_And_Submit_Cmds object 252 sends a request for status regarding an audit channel 260 to the Manage_Binary_Links object 258 (step 344 in FIG. 14A). It is worth noting that there may be, for example, multiple channels for binary link to most of the network devices 20A–20N. In such a case, one channel is used for audit commands and is designated as the audit_channel 260. Another channel is used for administration commands and is designated as admin_channel 261. An additional channel used is used for connect/disconnect commands and is designated as the connect_channel 282. A normalization_ channel 271 may also be provided. The Message_Binary_ Links object 258 then checks the status of the Audit_ Channel 261 (step 346 in FIG. 14A). The Manage_Binary_ Links object 258 then sends a Binary_Link_Status message 262 to the Format_And_Submit_Cmds object 252 that specifies if the audit_channel 260 is available or not (step 348 in FIG. 14A). If the audit_channel 281 is not available for either of the binary links (see step 350 in FIG. 14B). The Format_And_Submit_Cmds object 252 rejects the command and sends a response to the client application program indicating that the command cannot be processed (step 352 in FIG. 14B). If, however, the audit_channel on the binary link is available (see step 350 in FIG. 14B), the Format_And_Submit_Cmds object 252 sends the formatted audit command to the Manage_Binary_Links object 258 (step 354 in FIG. 14B). The Manage_Binary_Links object 258 then sends the audit command as a Binary_ Device_Cmd command 264 to the destination network device (step 256 in FIG. 14B).

The destination network device receives the formatted audit command and generates configuration information in the form of Binary_Device_Data 266 that is received by the Queue_Binary_Device_Data object 268 (step 358 in FIG. 14B). The Queue_Binary_Device_Data object 268 places the response in the Binary_Device_Data_Queue 270 (step 360 in FIG. 14B). The Parse_Binary_Device_ Data object 272 retrieves and parses the data stored in the Binary_Device_Data_Queue 270 (step 362 in FIG. 14B). The data is sent to the Process_Audit_Response object 274 by the Parse_Binary_Device_Data object 272 (step 364 in FIG. 14B). The Process_Audit_Response object 274 places a copy of the retrieved data in the Audit_Cmd_ Queue 236 and matches the data with the original audit command (step 366 in FIG. 14B). The Audit_Cmd_Queue 236 is the same queue in which audit commands are placed by the Queue_Device_Cmds object 230. The matching of the response with the original command is achieved by matching sequence numbers. In particular, the response includes the same sequence number that was added by the Queue_Device_Cmds object 230. The Process_Audit Response object 234 controls the submission of audit commands by ensuring that a command to a particular network device is not submitted until response to the last audit command is received. The Process_Audit_Response object 274 has access to the Realtime_Network_Device_Data 256 and updates this data in response to the received response data. The Process_Audit Response object 274 sends the response, NIFTE_Force_Audit_Resp 278 to the client application program that sent the original command. The Respondent_Mailbox_List 308 is used to determine where to send the response (step 368 in FIG. 14B).

Figure 15A:
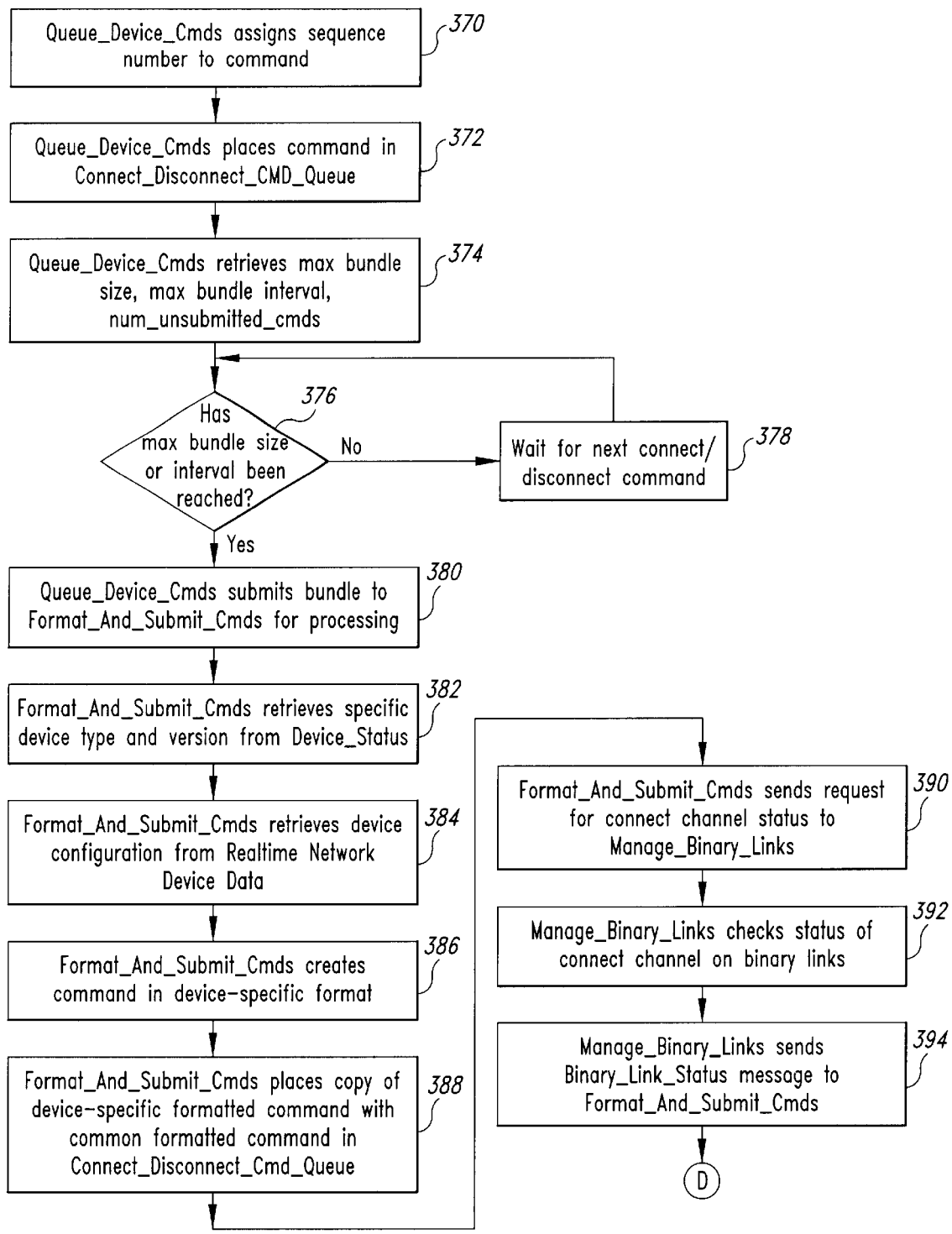
FIGS. 15A, 15B, and 15C show a flow chart of the steps performed by the device-specific interface module when a port connect or port disconnect command is received.
Figure 15B:
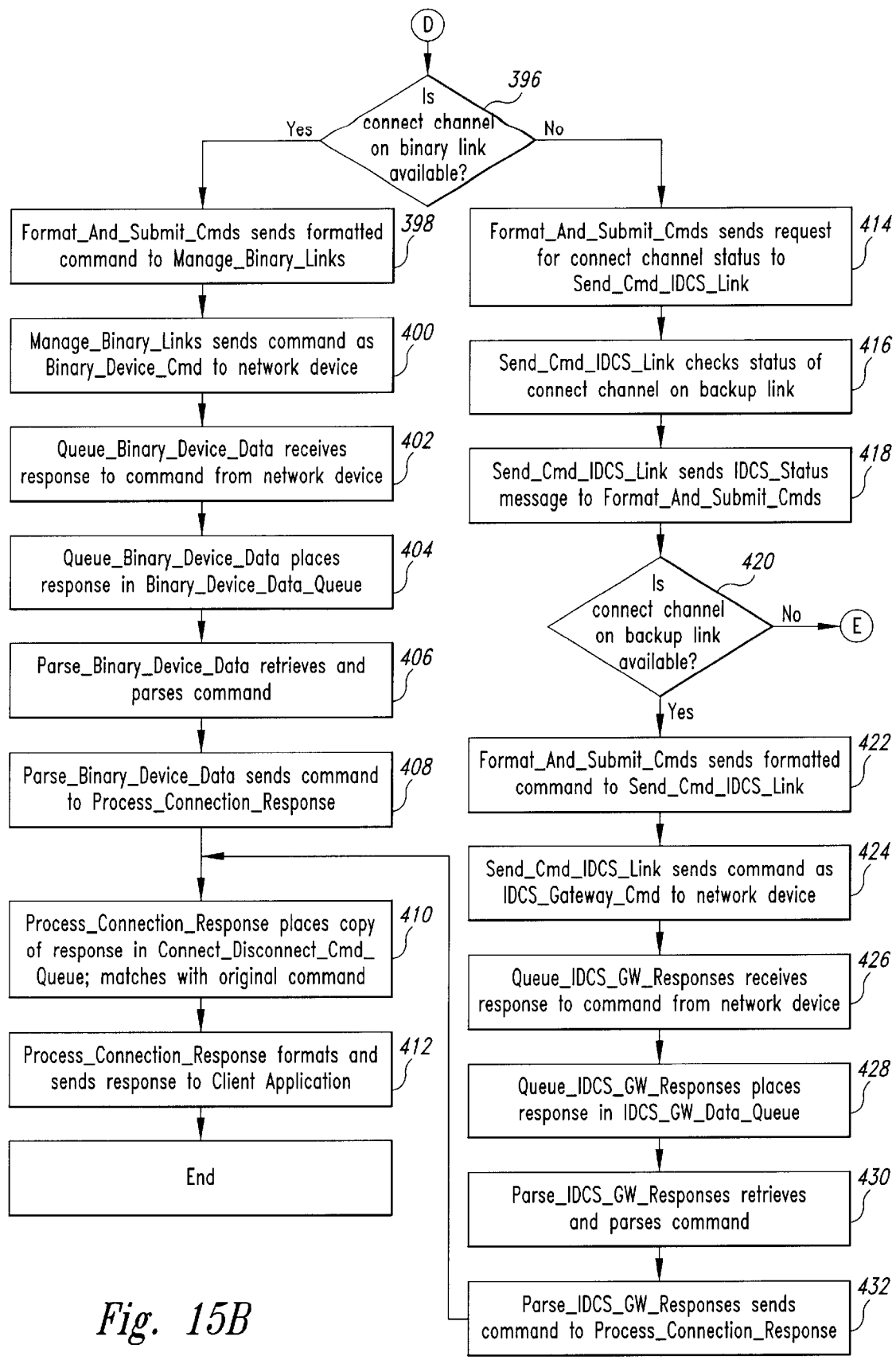
Figure 15C:
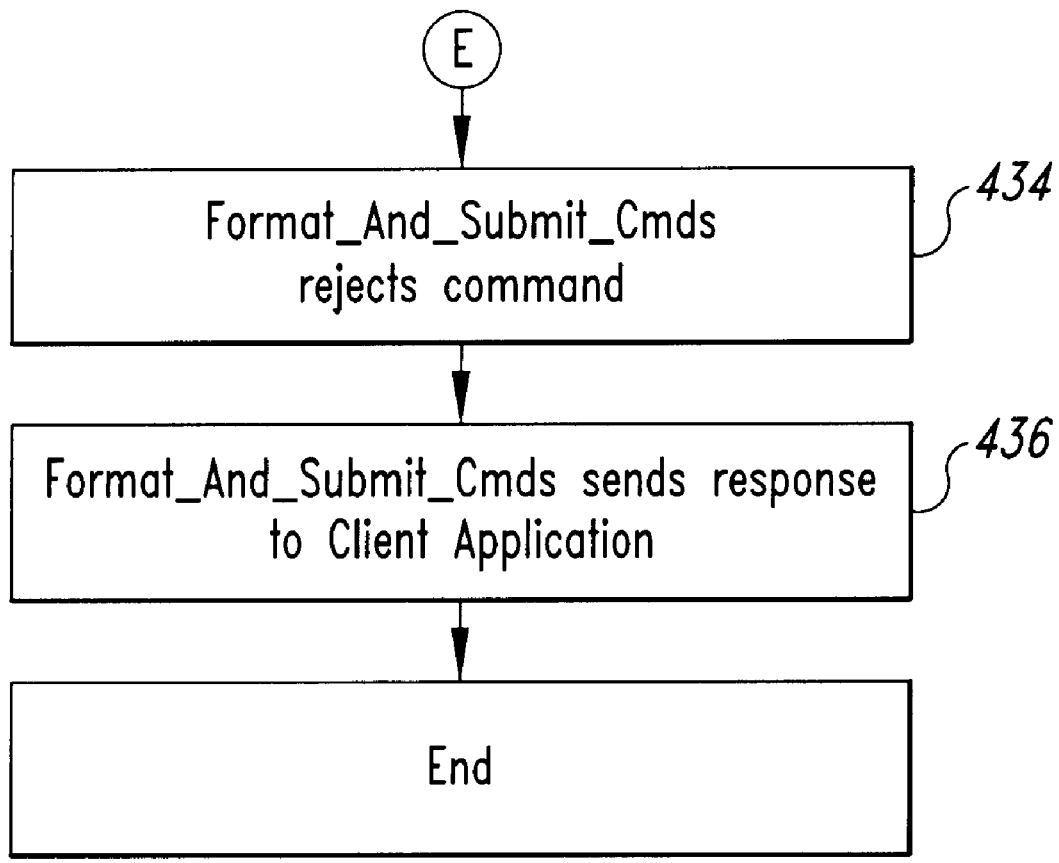

The Queue _Device Cmds object 230 may also receive port connect and port disconnect commands from the Verify Device_Cmds object 120 (FIG. 5). FIGS. 15A–15C provide a flowchart of the steps that are performed in processing such port connect and port disconnect commands within the device-specific interface module 52 (FIG. 4). Initially, the Queue_Device_Cmds object 230 assigns a sequence number to the received port connect or port disconnect command (step 370 in FIG. 15A). The sequence numbers are obtained from the Next_Sequence_Number server 234, which was discussed above. The Queue_Device_Cmds object 230 then places the connect or disconnect command in the Connect_Disconnect_Cmd_Queue 238 (step 372 in FIG. 15A). This queue is dedicated to the destination network device to which the command is destined. For purposes of efficiency, multiple connect/disconnect commands are bundled together and received and forwarded to network devices 20A–20N in bundles. The maximum bundle size is the maximum number of commands that a particular network device 20A–20N can handle. The maximum bundle interval is the time that the Queue_Device_Cmds object 230 is instructed to wait prior to submitting a next bundle of commands for processing. This prevents excess waiting to collect a sufficient number of connect/disconnect commands to realize the maximum bundle size.

In step 374 of FIG. 15A, the Queue_Device_Cmds object 230 retrieves the maximum bundle size (i.e., max_batch_size), maximum bundle interval (i.e., max_batch_interval) 280, and the number of unsubmitted commands in the Connect_Disconnect_Cmd_Queue 238, which is designated as Num_Unsubmitted_Cmds 242. The Queue_Device_Cmds object 230 determines whether the maximum bundle size has been reached by comparing the Num_Unsubmitted_Cmds 242 with the retrieved maximum bundle size and also determines whether the maximum bundle interval has been reached (step 376 in FIG. 15A). If the maximum bundle size has not been reached or the maximum bundle interval has not been reached, the object must wait for the next connect/disconnect command (step 378 in FIG. 15A). However, if the maximum bundle size has been reached or if the maximum bundle interval has been reached (as checked in step 376 of FIG. 15A), the Queue_Device_Cmds object 230 submits the bundle of commands to the Format_And_Submit_Cmds object 252 for future processing (step 380 in FIG. 15A). The Format_And_Submit_Cmds object 252 sends the max_batch_interval to an interrupt generator 273 that generates a wakeup_interrupt 275 when the maximum interval has been reached.

The Format_And_Submit_Cmds object 252 also looks at some additional values 277 in determining whether to send a command or not. The Max_Cmd_Age_Before_Resending specifies the maximum amount of time that may be waited after a command is initially sent out before resending due to the lack of a response. The Max_Resend_Retries value specifies how many times a command may be resent before efforts are exhausted. The Cmd_Metering value specifies a maximum number of commands that may be concurrently outstanding.

The Format_And_Submit_Cmds object 252 retrieves device-type and version information for the destination device from the Device_Status file 254 (step 382 in FIG. 15A). This information is used to determine the device type and current version information for the destination network device 20A–20N. The Format_And_Submit_Cmds object 252 subsequently retrieves device configuration information from the Realtime_Network_Device_Data 256 (step 384 in FIG. 15A) to determine if the network device is properly configured and can receive the connect/disconnect command. The Format_And_Submit_Cmds object 252 creates a connect/disconnect command in the device-specific format of the destination network device 20A–20N (step 386 in FIG. 15A).

A copy of the device-specific command is placed in the Connect_Disconnect_Cmd_Queue 238 (step 388 in FIG. 15A). The Format_And_Submit_Cmds object 252 sends a request to the Manage_Binary_Links object 258 to examine connect channel status for the binary links 42A–42N and 44A–44A (step 390 in FIG. 15A). The Manage_Binary_Links object 258 checks the status of the connect channels 282 of the binary links (step 392 in FIG. 15A) and sends this information in a Binary_Link_Status message 262 that is sent to the Format_And_Submit_Cmds object 252 (step 394 in FIG. 15A).

Connect/disconnect commands can be sent over the primary communication pathway or the backup communication pathway that passes through communication gateway 24 (FIGS. 1 and 3). If the connect channels on both the primary links are unavailable, the backup link may be utilized.

In step 396 of FIG. 15B, the Format_And_Submit_Cmds object 252 determines whether the connect channel on the binary links is available or not. If the connect channel on the primary or backup binary link is available, the Format_And_Submit_Cmds object 252 sends the formatted connect/disconnect command to the Manage_Binary_Links object 258 (step 398 in FIG. 15B). The Manage_Binary_Links object 258 sends the command as a Binary_Device_Cmd command 264 to the destination network device (step 400 in FIG. 15B).

The destination network device receives the connect/disconnect command and generates a response. This response is forwarded to the Queue_Binary_Device_Data object 268 (step 402 in FIG. 15B). The Queue_Binary_Device_Data object 268 places the response in the Binary_Device_Data_Queue 270 (step 404 in FIG. 15B). The Parse_Binary_Device_Data object 272 retrieves the response from the Binary_Device_Data_Queue 270 and parses the response (step 406 in FIG. 15B). The Parse_Binary_Device_Data object 272 sends a response command to the Process_Connection_Response object 304 (step 408 in FIG. 15B). The Process_Connection_Response object 304 places a copy of the response in the Connect_Disconnect_Cmd_Queue 238, where the response is matched with the original command on the basis of the sequence number (step 410 in FIG. 15B). The Process_Connection_Response object 304 updates the Realtime_Network_Device_Data 256 in view of the response. The Process_Connection_Response object then generates a response 310 or 312 that is sent to the client application program that sent the initial command (step 412 in FIG. 15B).

If in step 396 of FIG. 15B it is determined that the connection channel on either of the binary links is not available, the Format_And_Submit_Cmds object 252 sends a request for the status of the connection channel to the Send_Cmd_IDCS_Link object 284 (step 414 in FIG. 15B). In response, the Send_Cmd_IDCS_Link object 284 checks the status of the connect channel 283 on the backup link (step 416 in FIG. 15B), and it sends an IDCS message 286 that contains information regarding the status of the connect channel 283 on the backup link to the Format_And_Submit_Cmds object 252 (step 418 in FIG. 15B). Thus, in step 420 of FIG. 15B, the Format_And_Submit_Cmds object 252 makes a determination of whether the connect channel on the backup link is available.

If the connect channel 283 on the backup link is available, the Format_And_Submit_Cmds object 252 sends a formatted connect/disconnect command to the Send_Cmd_IDCS_Link object 284 (step 422 in FIG. 15B). The Send_Cmd_IDCS_Link object 284 sends the connect/disconnect command as an IDCS_Gateway_Cmd command 290 to the destination network device (step 424 in FIG. 15B). The destination network device receives the command and attempts to connect or disconnect the port depending on the nature of the command.

A response is sent from the destination network device. This response, IDCS_Gateway_RESP 294, is received by the Queue_IDCS_GW_Responses object 292 (step 426 in FIG. 15B). This object 292 places the response in the IDCS_GW_Data_Queue 296 (step 428 in FIG. 15B). The Parse_IDCS_GW_Responses object 300 retrieves and parses the response that was placed in the IDCS_GW_Data_Queue 296 (step 430 in FIG. 15B). The Parse_IDCS_GW_Responses object 300 sends the command to the Process_Connection_Response object 304 (step 432 in FIG. 15B) where it is processed as discussed above beginning at step 410.

It should be noted that if the response that was retrieved from the queue 296 were instead a response to an administrative command, the response would be forwarded to the Process_IDCS_GW_Admin_Responses object 302, which would process the response.

If it is determined in step 420 of FIG. 15B that the connect channel 283 in the backup link is not available, the Format_And_Submit_Cmds object 252 rejects the connect/disconnect command (step 434 in FIG. 15C). The Format_And_Submit_Cmds object 252 then sends a response to the client application program indicating the rejection (step 436 in FIG. 15C).

Commands that are received by the Queue_Device_Cmds object may be administrative commands as well. These commands are immediately placed in the Administration_Cmd_Queue 240 where they are immediately submitted by the Format_And_Submit_Cmds object 252. The administration commands are generated by the NIFTE at startup to configure the binary links 42A–42N, 44A–44N, network device identifiers, and alarm filter tables. Such administrative commands may be sent over the admin_channel 261 to the Manage_Binary_Links object 258, that sends the commands to the appropriate destination.

The Manage_Binary_Links object 258 manages the binary links 42A–42N and 44A–44N by monitoring such links and determining the most reliable link of each pair which it designates as the primary link. The Manage_Binary_Links object 258 is also responsible for switching communications from one link to another when one fails, dynamically configuring links, and providing maintenance.

The Manage_Binary_Links object 258 ensures that links are available by sending keepalive commands to network devices 20A–20N at regular intervals. The keepalive commands cause the network devices to perform no action, but solicit responses from the network devices and the corresponding link if both are still properly functioning. A Keepalive_Timer 263 triggers the Manage_Binary_Links object 258 to send a keepalive command at specified time intervals. The Manage_Binary_Links object 258 requeues the Keepalive-Timer 263 after the sending of a keepalive command by sending a Keepalive_Timer_Interval message 265 to the Keepalive_Timer 263. If a response to a keepalive command is not received after a certain interval of time, the Manage_Binary_Links object 258 will disconnect and reconnect the link. The responses to keepalive commands are sent via the Queue_Binary_Device_Data object 268, which sends a Keepalive_Timer_Interval message 265 to the Keepalive_Timer 263 to confirm the availability of the associated link.

As mentioned above, the Manage_Binary Links object 258 determines the most reliable link of a binary link pair and designates the most reliable link as the primary link. The other pair is designated as the secondary link. If the primary link fails, the Manage_Binary_Links object 258 switches communications to the secondary link.

As was also mentioned above, the Manage_Binary_Links object 258 is able to dynamically configure a binary link. If configuration or maintenance of a primary link is required, this object switches communications to the secondary link, designates a secondary link to be the new primary link, and brings down the old primary link. When this configuration is complete, the newly designated secondary link is brought back up, but communications remain with the newly designated primary link. This approach ensures availability of communications even during configuration and maintenance activities.

The discussion above has talked about instances where the Queue_Binary_Device_Data object 268 has received either a response to a connect/disconnect message, a response to a keepalive command, or a response to an audit command. If the message is an unsolicited message indicating that disconnection of a binary link, a Binary_Link_Status message 267 indicating the receipt of such a response is sent to the Manage Binary_Links object 258.

Figure 16:
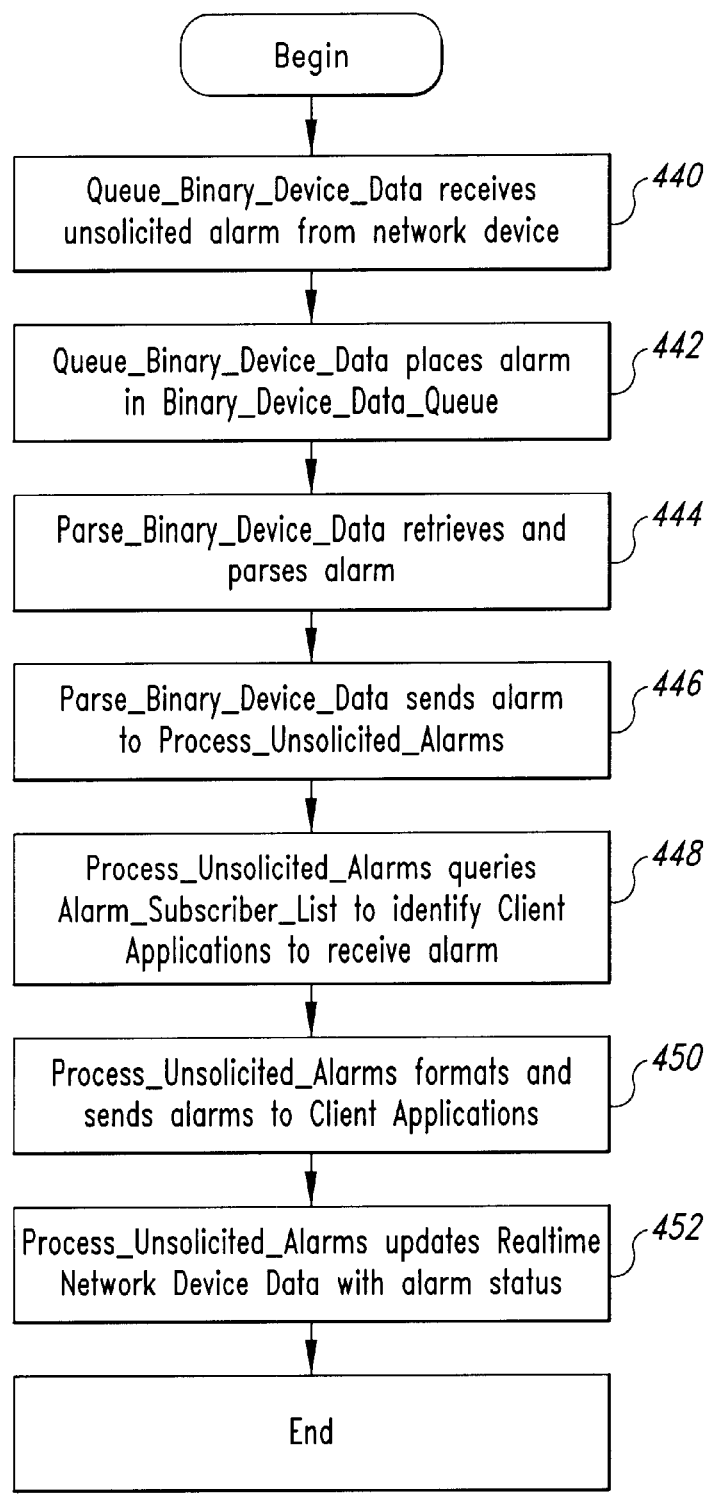
FIG. 16 is a flow chart illustrating the steps that are performed when an unsolicited alarm is received by the NIFTE.

The Queue_Binary_Device_Data object 268 may also receive unsolicited alarms from network devices 20A–20N. FIG. 16 is a flowchart illustrating the steps that are performed in such instances. Initially, the Queue_Binary_Device_Data object 268 receives a unsolicited alarm from a network device 20A–20N (step 440 in FIG. 16). The Queue_Binary_Device_Data object 268 places the unsolicited alarm in the Binary_Device_Data_Queue 270 (step 442 in FIG. 16). The Parse_Binary_Device_Data object 272 retrieves the unsolicited alarm from the queue and parses the alarm (step 444 in FIG. 16). The Parse_Binary_Device_Data object 272 sends the parsed alarm to the Process_Unsolicited_Alarms object 318 (step 446 in FIG. 16). This object 318 queries the Alarm_Subscriber_List 320 to identify any client application programs that have registered to receive such an unsolicited alarm (step 448 in FIG. 16). The Process_Unsolicited_Alarms object 318 then formats the unsolicited alarm and sends the unsolicited alarm to the client application programs by sending a NIFTE_Alarm_Notification message 322 (step 450 in FIG. 16). The Process_Unsolicited_Alarms object 318 updates the Realtime_Network_Device_Data 256 with the alarm status information (step 452 in FIG. 16).

Figure 17:
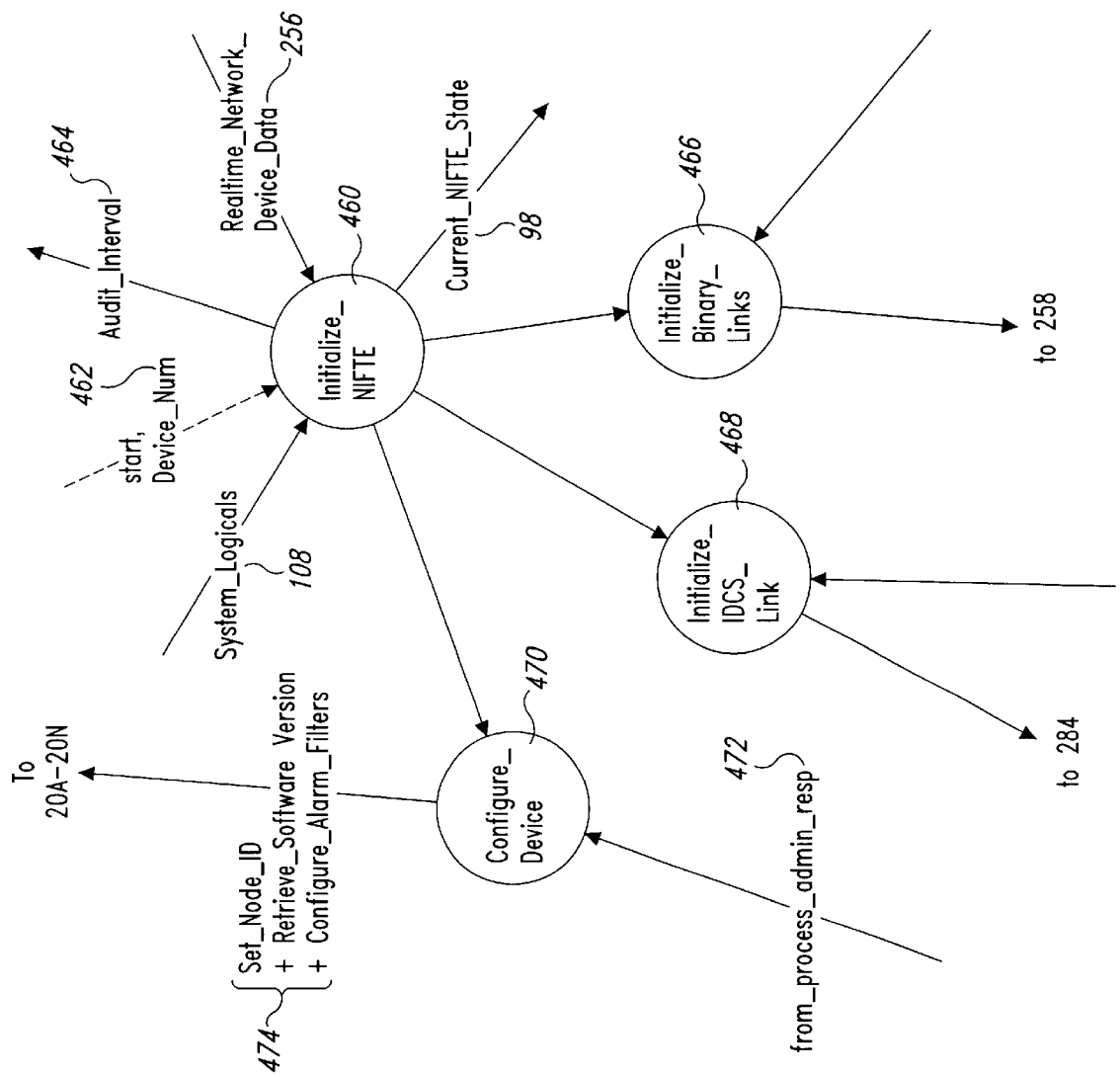
FIG. 17 is a data flow diagram for the components of the initialization module of FIG. 4.
Figure 18:
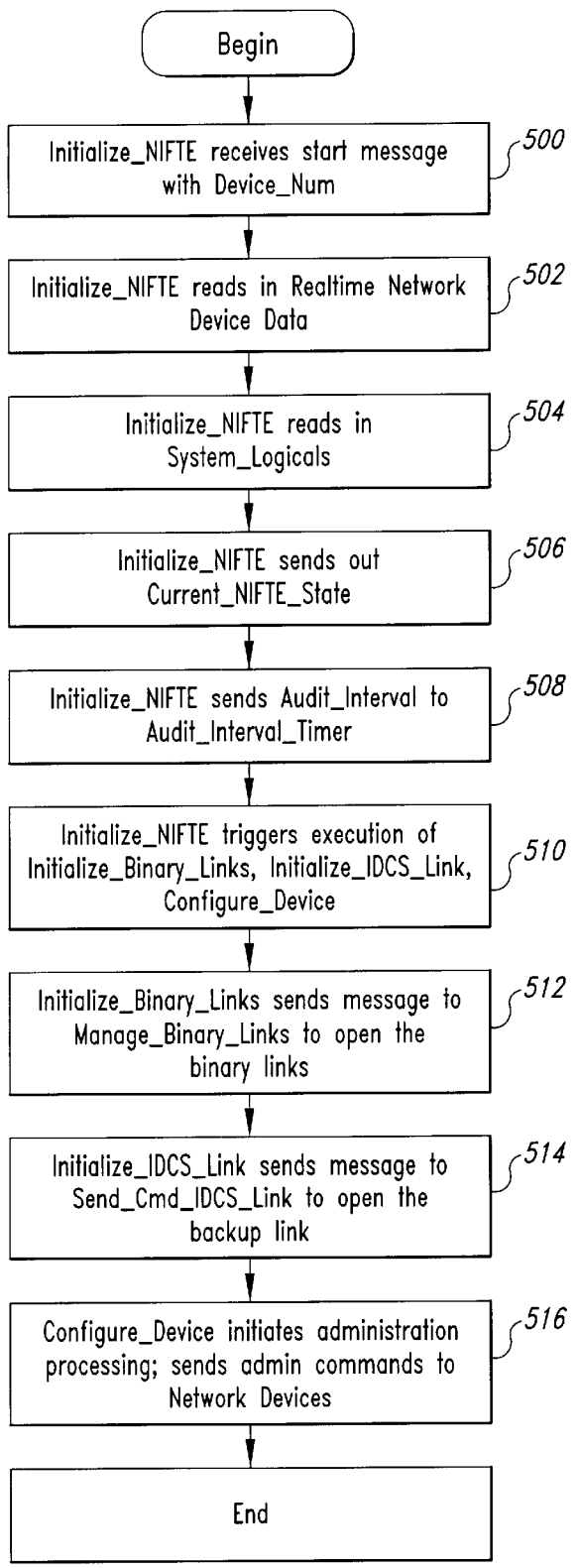
FIG. 18 is a flow chart illustrating the steps performed by the initialization module.

FIG. 17 shows the architecture of the initialization module 54 (FIG. 4). Specifically, FIG. 17 shows a data flow diagram of the objects that make up the initialization component. As can be seen in FIG. 17, the initialization module includes the Initialize_NIFTE object 460. This object 460 is responsible for starting the initialization process. As shown in FIG. 18, the Initialize_NIFTE object 460 receives a start message to start initialization with a specified device number, Device_Num, 462 (step 500 in FIG. 18). The Device_Num in the start message identifies a particular network device 20A–20N with which the current instance of the NIFTE is to establish communications. The Initialize_NIFTE object 460 begins initialization and reads the Realtime_Network_Device_Data 256 to obtain configuration information that is needed to open the binary links 42A–42N and 44A–44N (step 502 in FIG. 18). The Initialize_NIFTE object 460 also reads in the System_Logicals 108 from the operating system for later use (step 504 in FIG. 18). The Current_NIFTE_State 98 is established and sent out by the Initialize_NIFTE object 460 (step 506 in FIG. 18). In addition, the Initialize_NIFTE object 460 sends an Audit_Interval message 464 to the Audit_Interval_Timer 102 (FIG. 5) to establish the audit interval (step 508 in FIG. 18). Lastly, the Initialize_NIFTE object 460 triggers the execution of the Initialize_Binary_Links object 466, the Initialize_IDCS_Link object 468, and the Configure_Device object 470 (step 510 in FIG. 18).

The Initialize_Binary_Links object 466 retrieves information that is needed to open the binary links 42A–42N and 44A–44N from the Initialize_NIFTE object 460. This is the information that was retrieved from the Realtime_Network_Device_Data 256 by the Initialize_NIFTE object 460. The Initialize_Binary_Links object 466 sends a message with the configuration data to the Manage_Binary_Links object 258 (FIG. 13) to open the binary links (step 512 in FIG. 18).

The Initialize_IDCS_Link object 468 receives data from the Initialize_NIFTE object 460 to open backup link. The Initialize_IDCS_Link object 468 then sends a message with this data to the Send_Cmd_IDCS_Link object 284 (FIG. 13) to open the backup link (step 514 in FIG. 18).

The Configure_Device object 470 initiates administrative processing. This object 470 sends administrative commands 474 to the network devices 20A–20N to solicit information from such devices (step 516 in FIG. 18). The commands include the Set_Node_ID command, the Retrieve_Software_Version command, and the Configure_Alarm_Filters command. Responses 472 to these commands are subsequently received by the Configure_Device object.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. In a telecommunications network having a plurality of network devices and a processor, wherein the processor runs at least one of a plurality of programs for communicating with the plurality of network devices and each of said plurality of network devices has a device-specific communication format, a method of interfacing programs with network devices, comprising the computer-implemented steps of:

providing an interface for interfacing a selected one of the plurality of programs with the network devices, wherein said interface comprises real-time network device data from a database, operatively coupled to said interface, that reflects current a configuration and topology of said network devices;

receiving a first communication destined to a selected one of the plurality of network devices from the selected one of the plurality of programs of the interface in a first format;

with the interface, converting the first communication from the first format to a second format that is the device-specific communication format of the selected one of the plurality of network devices; and forwarding the converted first communication in the second format from the interface to the selected one of the plurality of network devices.

2. The method of claim 1, comprising the steps of:

receiving a second communication from the selected one program at the interface, said second communication being destined to one of the plurality of network devices that is a different one of the network devices than the selected one of the plurality of network devices, and said second communication being in the first format;

with the interface, converting the second communication from the first format to a third format that is the device-specific communication format of the given network device; and forwarding the converted second communication in the third format from the interface to the given network device.

3. The method of claim 2 wherein the selected one of the plurality of network devices and the given one of the plurality of network devices are different types of network devices.

4. The method of claim 2 wherein the selected network device and the given network device are a same type of network device that executes programmable instructions but the selected network device and the given network device execute different versions of the programmable instructions.

5. The method of claim 1, further comprising the steps of:

receiving a second communication that is destined to the program from a given one of the network devices at the interface, said second communication being in a device-specific communication format of the given network device;

with the interface, converting the second communication from the device-specific communication format of the given network device to a format that is compatible with the program; and forwarding the converted second communication to the program from the interface.

6. The method of claim 5 wherein the second communication is a response from the given network device to a communication sent from the program.

7. The method of claim 5 wherein the second communication is an unsolicited alarm indicating a problem in the telecommunications network.

8. The method of claim 1 wherein the telecommunications network is a telephone network.

9. The method of claim 1 wherein the processor runs multiple programs and the interface interfaces the multiple programs with the plurality of network devices.

10. The method of claim 1 wherein multiple instances of the interface are provided such that a separate instance of the interface is provided for each of said plurality of network devices.

11. The method of claim 1 wherein the first communication is a command to request the selected network device to perform an action for the program.

12. The method of claim 11 wherein the command is an audit command asking the selected network device to provide information about status of the selected network device.

13. The method of claim 1 wherein the selected network device is a digital cross connect (DXC).

14. The method of claim 1 wherein the program is a restoration program for restoring the network from a failure.

15. A telecommunications network, comprising:
a plurality of programs run on a processor, each of said plurality of programs having a communication format for communications;
a plurality of network devices, each of said plurality of network devices having a device-specific communication format for communications; and
an interface for interfacing the plurality of programs with the plurality of network devices to facilitate communications between the programs and the network devices, said interface including:
  at least a first converter for converting communications from the programs that are destined to network devices into the device-specific communication formats of the network devices, and a real-time network device database, operatively coupled to said interface that reflects current configuration and topology of said network devices.

16. The telecommunications network of claim 15 wherein the interface further includes a second converter for converting communications from the network devices into the communication format of the program.

17. The telecommunications network of claim 15 wherein the network is a telephone network.

18. The telecommunications network of claim 15, further comprising at least one additional program run on the processor that communicates with the network devices and wherein the interface interfaces the programs with the network devices.

19. The telecommunications network of claim 15 wherein at least one of said plurality of programs is a restoration program for restoring the network from a failure.

20. The telecommunications network of claim 15 wherein the interface includes an audit mechanism for automatically auditing at least one of the network devices to obtain information regarding the status of the network device without a request originating outside of the interface for the auditing.

21. The telecommunications network of claim 15 wherein at least one of the network devices is a digital cross-connect.

22. The telecommunications network of claim 15 wherein the network devices include devices of different types.

23. The method of claim 1, wherein said interface further comprises two redundant data links operatively coupled to said network devices, wherein communication between said interface and said network devices includes establishing a primary link, and wherein said primary link is designated as the first link to respond to a connection request over said two redundant data links.

24. The method of claim 23, wherein said connection request is sent to at least one of said network devices.

25. The method of claim 23, wherein said connection request is sent to one of said network devices being interfaced with said interface.

26. The method of claim 23, wherein communication between said interface and said network devices occurs over one of said two redundant data links at a time.

27. The method of claim 23, wherein said interface farther comprises at least two instances, a first instance serving as a primary interface and a second instance serving as a backup interface.

28. The method of claim 27, wherein said two instances are run on separate computer systems, each of which being operatively coupled to said network devices.

29. The method of claim 27, wherein said primary interface is capable of operating in at least one of a normal readiness mode and an alert readiness mode.

30. The method of claim 29, wherein said alert readiness mode ceases auditing and background processing which occurs in said normal readiness mode.

31. The network of claim 15, wherein said interface comprises two redundant data links operatively coupled to said network devices, and communication between said interface and said network devices includes establishing a primary link, and wherein said primary link is designated as the first link to respond to a connection request over said two redundant data links.

32. The network of claim 31, wherein said connection request is sent to at least one of said network devices.

33. The network of claim 31, wherein said connection request is sent to one of said network devices being interfaced with said interface.

34. The network of claim 31, wherein communication between said interface and said network devices occurs over one of said two redundant data links at a time.

35. The network of claim 31, wherein said interface farther comprises at least two instances, a first instance serving as a primary interface and a second instance serving as a backup interface.

36. The network of claim 35, wherein said two instances are run on separate computer systems, each of which being operatively coupled to said network devices.

37. The network of claim 35, wherein said primary interface is capable of operating in at least one of a normal readiness mode and an alert readiness mode.

38. The network of claim 37, wherein said alert readiness mode ceases auditing and background processing which occurs in said normal readiness mode.

* * * * *